US008825354B2

(12) United States Patent
Horita

(10) Patent No.: US 8,825,354 B2
(45) Date of Patent: Sep. 2, 2014

(54) SYSTEM FOR SUPPORTING A USER OF AN ELECTRICALLY DRIVEN VEHICLE

(75) Inventor: Yuki Horita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 17 days.

(21) Appl. No.: 13/599,442

(22) Filed: Aug. 30, 2012

(65) Prior Publication Data

US 2013/0226441 A1    Aug. 29, 2013

(30) Foreign Application Priority Data

Oct. 7, 2011    (EP) .................................... 11184289

(51) Int. Cl.
     *G06F 19/00*      (2011.01)

(52) U.S. Cl.
     USPC ......................................................... 701/118

(58) Field of Classification Search
None
See application file for complete search history.

(56) References Cited

U.S. PATENT DOCUMENTS

| 5,815,824 | A | 9/1998 | Saga et al. |
| 2010/0094496 | A1 | 4/2010 | Hershkovitz et al. |
| 2011/0032110 | A1 | 2/2011 | Taguchi |
| 2011/0213520 | A1* | 9/2011 | Yaguchi et al. .................. 701/22 |
| 2012/0032637 | A1* | 2/2012 | Kotooka et al. ............... 320/109 |
| 2012/0035795 | A1* | 2/2012 | Yu et al. ........................... 701/22 |
| 2012/0083932 | A1* | 4/2012 | Ramaswamy et al. ........ 700/291 |
| 2012/0112696 | A1* | 5/2012 | Ikeda et al. .................... 320/109 |
| 2012/0136570 | A1* | 5/2012 | Yamashita et al. ............ 701/437 |
| 2012/0253655 | A1* | 10/2012 | Yamada et al. ............... 701/409 |

FOREIGN PATENT DOCUMENTS

EP      2 365 285 A2      9/2011

OTHER PUBLICATIONS

European Patent Office search report on application 11 18 4289 dated Feb. 8, 2012; 5 pages.

* cited by examiner

*Primary Examiner* — Thomas Tarcza
*Assistant Examiner* — Adam Alharbi
(74) *Attorney, Agent, or Firm* — Foley & Lardner LLP

(57) ABSTRACT

A system for supporting a user of an electrically driven vehicle comprises position information obtaining unit for obtaining, during traveling, position information indicating a position of the vehicle, electric power amount estimating unit for estimating, during traveling, a remaining electric power amount of an electric power source of the vehicle, shortage risk estimating unit for estimating, during traveling, an estimated risk of electric power amount shortage on the basis of the estimated remaining electric power amount, and notifying unit for notifying a user in case the estimated risk of electric power amount shortage estimated by the shortage risk estimating unit exceeds a predetermined threshold value.

10 Claims, 15 Drawing Sheets

SYSTEM FOR SUPPORTING A USER OF AN ELECTRICALLY DRIVEN VEHICLE

INCORPORATION BY REFERENCE

The present application claims priority from European Patent application No. 11184289.4 filed on Oct. 7, 2011, the contents of which are hereby incorporated by reference into this application.

BACKGROUND

The subject matter disclosed in the present application relates to a system for supporting a user of an electrically driven vehicle such as an electric vehicle or a plug-in hybrid electric vehicle.

Electric vehicles (EV) and plug-in-hybrid electric vehicles (PHEV) are becoming more and more popular because of their environmental and economical perspectives. Such electrically driven vehicles need to be equipped with a sufficiently charged battery in the vehicle. Otherwise, there may occur a risk that the remaining driving distance becomes insufficient or even that the battery may run out. When becoming aware of the risk of a battery shortage, the user needs to find a remedy for the situation and currently, charging of the battery is then required which can be performed by the user at a public charging station or at a parking space with charging station equipment. However, since it currently takes a long time to charge the battery, unlike fuelling a car having a combustion engine, if a user finds the charging station occupied, the user may need to wait for hours or to find another place for charging.

For drivers and/or co-drivers of electric vehicles or plug-in hybrid electric vehicles (in the following sometimes referred to as users), the available remaining driving distance and a potential risk of a battery shortage on the way are among the main worrying issues, especially since the battery capacity is typically limited and, currently even if the battery is fully charged, the maximum distance in the best condition is typically less than 200 km. Such poor battery capacity is one reason that increases the risk of the battery shortage. In order to have a sufficient available remaining driving distance and in order to avoid the occurrence of a battery shortage on the way, users of electric vehicles or plug-in hybrid electric vehicles need to sufficiently charge the battery and keep attention on the power level. However, because of the time that is currently necessary for charging the battery, the users may often not rely on usability of public charging stations, when needed. In view of such problems, there have been considered charging-station booking systems allowing users of electric vehicles or plug-in hybrid electric vehicles to make reservations for charging stations in advance of a planned trip.

For example, US 2011/0032110 A1 proposes an electric power amount information output device for a vehicle comprising a control section checks, prior to the trip after setting an departure point and a destination point, whether a remaining electric power amount of a battery of a motor-driven vehicle at the departure point is less than a total electric power amount required for the vehicle to travel to the destination point. The control section drives an output section to output insufficiency information indicating that the remaining electric power amount of the battery is insufficient, if the remaining electric power amount is less than the required total electric power amount.

However, since the proposed device of US 2011/0032110 A1 is merely relating to an operation at the departure point, prior to the actual trip, for reserving a charging station statically but is not handling the reservation dynamically during travelling, the inventors of the present application have considered that there remains a problem that the user of the electric vehicle or the plug-in hybrid electric vehicles may still suffer from the risk of a battery shortage due to unexpected incidents and influences such as traffic conditions, including traffic accidents, traffic jams and road work, and/or weather conditions that may occur dynamically during travelling. In particular, such static charging station reservation planning as proposed in US 2011/0032110 A1 does not provide any capacities for handling dynamic situation changes. For example, it is considered by the inventors that if the user is caught in a heavy traffic jam, there may be the increased risk of a battery shortage occurring in the traffic jam and/or there may occur the risk that the traffic jam leads to a delay which may make it impossible to reach a reserved charging station within the reserved time slot.

SUMMARY

In accordance with the above, it is provided that an improved system for supporting a user of an electrically driven vehicle which may help further reducing the risk that the user of the electric vehicle or the plug-in hybrid electric vehicle may still suffer from a battery shortage or that the remaining driving distance becomes insufficient.

According to the disclosure, there is proposed a system for supporting a user of an electrically driven vehicle, including a position information obtaining unit for obtaining, during traveling, position information indicating a position of the vehicle, an electric power amount estimating unit for estimating, during traveling, a remaining electric power amount of an electric power source of the vehicle, a shortage risk estimating unit for estimating, during traveling, an estimated risk of electric power amount shortage on the basis of the estimated remaining electric power amount, and a notifying unit for notifying a user in case the estimated risk of electric power amount shortage estimated by the shortage risk estimating unit exceeds a predetermined threshold.

Accordingly, it is the underlying concept of the present disclosure that the system may provide improved assistance to the users of electric vehicles or plug-in hybrid electric vehicles—not only at the departure point but also during traveling—so that it advantageously becomes possible to assist the user under dynamically changing situations during the trip. This advantageously improves the user assistance since it becomes possible to warn the user dynamically about changing situations which may unexpectedly occur during traveling and which may lead to previously unanticipated risks of the occurrence of a battery shortage and/or which may lead to a situation in which the remaining driving distance becomes insufficient.

Accordingly, the present disclosure advantageously makes it possible to dynamically inform the user about a potentially dynamically occurring risk of an occurrence of a battery shortage during traveling or a dynamical increase of a risk of occurrence of a battery shortage during traveling, advantageously allowing the user to dynamically react during travelling. Specifically, plural factors may dynamically affect the power consumption of the electrically driven vehicle during travelling such as dynamic usage of electric devices such as audio devices, air conditioning devices etc., dynamic usage of vehicle lights, dynamically occurring traffic conditions such as traffic accidents, road work, traffic jams, or even changing weather conditions (e.g. heat may lead to the necessity of using air conditioning and cold conditions may lead to the necessity of usage of heating devices, occurring fog may lead to the necessity to turn on additional lights, rain may lead to the necessity of using a wiper, snow may lead to a significantly different average speed and traveling time, etc.). The present disclosure advantageously helps to assist and support the user dynamically during driving.

According to preferred embodiments of the present disclosure, the system of the disclosure may be embodied by an on-board unit and/or a server (being communicably connected to electric vehicles or to an in-vehicle device) which is communicably connected to a support station infrastructure such as e.g. a charging station infrastructure and to a traffic information center by any media directly or indirectly, the server and/or the on-board unit having a unit for collecting the vehicle battery information, vehicle current location, vehicle destination position, support station availability information such as charging station availability information, weather condition and/or traffic information. The server and/or the on-board unit may repeatedly or even periodically monitor a risk of battery shortage dynamically based on the obtained information and, once the risk is detected, the server and/or the on-board unit may preferably suggest to the user the favorable support station candidate(s) such as charging station candidate(s) and/or, if the support station is a charging station, the favorable charging operation timing on the way autonomously. By doing so, compared to the prior art, the driver receives support that allows to timely and appropriately react to risks that are dynamically caused during traveling by various potential dynamically changing situations.

It is to be noted that while the present disclosure mainly described above and below with respect to support stations such as charging stations, where a user of an electrically driven vehicle can charge up a battery of the vehicle, it is further possible that a support station in the sense of the present disclosure represents a location where exchangeable charged batteries are available so that the user may exchange the battery of the vehicle with an exchangeable charged battery at the support station. Then, support station availability information may include information such as position of the support station, opening hours of the support station, availability of charged batteries at the support station (e.g. information indicating available numbers and/or available types of charged batteries, available support personnel for performing an exchange of the battery, etc.). In the case of charging stations, the support station availability information may include information such as position of the support station, opening hours of the support station, availability of charging units for charging the vehicle, number of available charging units for charging the vehicle types of available charging units for charging the vehicle (e.g. normal charging units or quick-charging units), available time slots for charging a vehicle, possibility of making a reservation for charging units at specific time slots, etc. Of course, the term support station in the sense of the present disclosure may further relate to location where a user has both possibilities of either charging the battery of the vehicle or exchanging the battery of the vehicle with a charged battery. A support station may further even be a service station which can be contacted by the user in order to order a battery exchange service at a pre-determined location which can be reached by the user.

Some of the preferred aspects and embodiments of the present disclosure shall be mentioned below.

According to a preferred aspect of the present disclosure, the shortage risk estimating unit is preferably configured to estimate the estimated risk of electric power amount shortage on the further basis of information indicating dynamic conditions affecting the power consumption of the vehicle during traveling, said information particularly preferably including at least one of traffic information, weather information and vehicle information. This advantageously improves the user assistance since it becomes possible to warn the user dynamically about changing situations which may lead to previously unanticipated risks of battery shortage, e.g., due to dynamic changes of the situation affecting the remaining electric power amount, such as usage of electric devices of the vehicle, weather conditions (e.g. activated lights necessary due to changing weather conditions, air conditioning becomes necessary etc.) or traffic conditions (such as longer travelling distances and/or travelling times due to road works, traffic accidents or traffic jam).

According to another preferred aspect of the present disclosure, the system preferably further includes a required electric power amount estimating unit for estimating, during traveling, a required electric power amount required for traveling with the vehicle from the determined position to a destination position, the shortage risk estimating unit being preferably configured to estimate the estimated risk of electric power amount shortage further on the basis of the estimated required electric power amount. This has the advantage that the risk for occurrence of a battery shortage during the trip to the destination position (as a final destination or an intermediate destination such as the destination of a support station such as a charging station) can be dynamically and reliably determined based on information indicating the required electric power amount required for traveling with the vehicle from the determined position to the destination position, which may dynamically change due to unexpected incidents such as traffic incidents on the current route such as road work, accidents or traffic jams or increased power consumption of electric devices due to changed weather conditions (e.g. air conditioner required if it becomes hot, lights required if there is fog, rain or snow, wiper operation required due to rain, snow or the like).

According to another preferred aspect of the present disclosure, the system preferably further includes a traffic information acquiring unit for acquiring traffic information. Then, the required electric power amount estimating unit is preferably configured to estimate the required electric power amount on the basis of traffic information acquired by the traffic information acquiring unit, and/or the shortage risk estimating unit is preferably configured to estimate the estimated risk of electric power amount shortage on the basis of traffic information acquired by the traffic information acquiring unit. This provides the advantage that the determination of a risk of occurrence of a battery shortage or other potential risk monitoring items such as, e.g., occurrence of a delayed arrival at a destinations such as a booked support station such as a booked charging station, can be more reliably and dynamically performed by taking into account potential risk increasing effects coming from dynamically changing traffic conditions during travelling. Further preferably, the traffic information includes at least one of traffic jam information, traffic accident information, road work information, traveling time information to advantageously allow for taking into account potentially dynamically changing traffic conditions such as road works, traffic jams and traffic accidents.

Further preferably, the system may further include a route calculation unit for calculating travel routes from the determined position to the destination position. Then, when the shortage risk estimating unit estimates that the estimated risk of electric power amount shortage exceeds a predetermined threshold due to traffic conditions on a current route which are indicated in the traffic information, the route calculation unit is preferably configured to calculate one or more alternative routes from the determined position to the destination position, and the required electric power amount estimating unit is preferably configured to estimate, preferably for each of the one or more alternative routes, an alternatively required electric power amount required for traveling with the vehicle from the determined position to the destination position along the respective alternative route. This may further improve the support for the user since it becomes possible not only to warn the user but additionally provide recommended solutions involving recommendations for potential alternative routes that may help avoiding the occurrence of a battery shortage prior to arriving at the destination. The system may further have the capability of warning the user if no suitable alternative route to the destination or to a support station such as a charging station can be found and, additionally, may suggest an alternative route in such a situation which guides the user to a safe place as an alternative destination (such as a road shoulder). It may further assist the user in calling for roadside assistance prior to or upon arrival at the safe place.

Further preferably, the shortage risk estimating unit is configured to estimate, for each of the one or more alternative routes, a respective estimated risk of electric power amount shortage on the basis of the remaining electric power amount and the alternatively required electric power amount. This advantageously provides the possibility of evaluating the recommended routes in view of their potential for avoiding the occurrence of a battery shortage prior to arriving at the destination.

Further preferably, the notifying unit is further configured to notify the user of the vehicle about alternative routes for which the respective estimated risk of electric power amount shortage estimated by the shortage risk estimating unit is below the predetermined threshold. Then, the user can appropriately react to the informed risk by selecting another route. If no such route is found, the notifying unit may notify the user about an alternative route to a safe place such as a road shoulder.

Further preferably, the system may further include a delay risk estimating unit for estimating, during traveling, an estimated risk of a delayed arrival time at the destination position on the basis of an intended arrival time being specified for the destination position and traffic information acquired by the traffic information acquiring unit, in particular wherein the destination position preferably represents a position of a specific support station such as a specific charging station and the intended arrival time preferably represents an intended arrival time at the support station such as e.g. a booked charging start time for the vehicle at the specific charging station. This advantageously adds a further possible risk monitoring item in addition to monitoring the risk of a battery shortage which is particularly advantageous if the destination is a booked support station such as a booked charging station (e.g. as a potential intermediate destination) for which a delayed arrival may mean that the reservation is lost and the battery shortage risk might be indirectly increased since the charging operation cannot be performed as planned at departure.

Further preferably, the notifying unit may be further configured to notify the user of the vehicle in case the estimated risk of a delayed arrival time estimated by the delay risk estimating unit exceeds a predetermined threshold. Then, the user can appropriately react to the informed risk by trying to find another faster or at least more energy-efficient route or rebook the charging station in advance (via the HMI device or also manually, e.g., via telephone or the internet).

According to another preferred aspect of the present disclosure, the system preferably further includes a support station information acquiring unit for acquiring support station information such as charging station information preferably including at least one of position information indicating positions of one or more support stations such as one or more charging stations and availability information indicating an availability status of one or more support stations such as one or more charging stations. This enables to provide the user with support station information which may help to better react on the detected risk of a battery shortage.

Further preferably, the required electric power amount estimating unit may be configured to estimate, preferably for each of one or more support stations indicated in the support station information, a required electric power amount required for traveling with the vehicle from the determined position to the position of the respective support station, and the shortage risk estimating unit is preferably configured to estimate, preferably for each of one or more support stations indicated in the support station information, an estimated risk of electric power amount shortage, when traveling from the determined position to the position of the respective support station. This further improves the support for the user since the user can be informed additionally on the risk of a battery shortage when heading towards one of the support stations in order to avoid the initially detected risk of a battery shortage.

Further preferably, the notifying unit may be configured to notify the user of the vehicle about support stations such as charging stations for which the estimated risk of electric power amount shortage estimated by the shortage risk estimating unit is below a predetermined threshold. Then, the user may appropriately select the potential support stations for avoiding the dynamically detected risk of a battery shortage. If no such potential support station is found, the notifying unit may be configured to notify the user of the vehicle about potential alternative destinations such as a safe place (e.g. a road shoulder) and/or a place where roadside assistance is available (e.g. for ordering a battery exchange).

Further preferably, the system may further include a support station booking support unit being configured to support booking of support stations such as charging stations that are available for booking operations via a communication network. This provide the advantage that the user is enabled to directly initiate booking or re-booking of a charging station or another support station if there is dynamically detected a risk of a battery shortage or a delayed arrival.

In particular, one or more of the following features may advantageously support the user when a risk is dynamically detected. Further preferably, the support station booking support unit may be configured to issue a request for reservation directed to one of the support stations such as charging stations indicated in the support station information, in particular when the shortage risk estimating unit estimates that the estimated risk of electric power amount shortage exceeds a predetermined threshold. Further preferably, the support station booking support unit may be configured to issue a request for cancellation of a reservation directed to a charging station or another support station indicated in the support station information, in particular when the estimated risk of electric power amount shortage for traveling with the vehicle from the determined position to the position of the respective charging station or the other support station exceeds a predetermined threshold.

The system may further include a roadside assistance requesting unit configured to issue a request for roadside assistance at an alternative destination e.g. at a safe place such as a road shoulder, which can still be reached on the basis of the remaining battery level, in case the risk of a battery shortage is detected and no suitable alternative routes or available support stations such as charging stations can be found in order to prevent the occurrence of the battery shortage. If roadside assistance (such as e.g. a battery exchange) is requested at the alternative destination, the route calculation unit may calculate a route to the alternative destination and the notifying unit may guide the user along the calculated route to the alternative destination.

According to another preferred aspect of the present disclosure, the system preferably further includes a weather information acquiring unit for acquiring weather information. Further preferably, the required electric power amount estimating unit may be configured to estimate the required electric power amount on the basis of weather information acquired by the weather information acquiring unit, and/or the shortage risk estimating unit may preferably be configured to estimate the estimated risk of electric power amount shortage on the basis of weather information acquired by the weather information acquiring unit. This provides the advantage that the determination of a risk of occurrence of a battery shortage or other potential risk monitoring items such as, e.g., occurrence of a delayed arrival at a destinations such as a support stations such as a booked charging station, can be more reliably and dynamically performed by taking into account potential risk increasing effects coming from dynamically changing weather conditions during travelling (e.g. air conditioner required if it becomes hot, lights required if there is fog, rain or snow, wiper operation required due to rain, snow or the like).

According to another preferred aspect of the present disclosure, the system preferably further includes an electric device usage information monitoring unit for monitoring, during traveling, electric device usage information indicating the usage of electric devices of the vehicle being electrically driven by the electric power source. Further preferably, the shortage risk estimating unit may be configured to estimate the estimated risk of electric power amount shortage on the basis of electric device usage information determined by the electric device usage information monitoring unit. This advantageously improves the determination if there is a risk of battery shortage since it becomes possible to perform the dynamical determination on the basis of other potential risk increasing influences (such as activated radio, air conditioner, lights, a communication unit, vehicle sensors or the like, which affect the speed of battery power level reduction and may also be dynamically activated or deactivated by the user). For example, after the user activates an electric device during travelling, such as e.g. the air conditioner, there may be the possibility that the risk of a battery shortage prior to arriving at the destination dynamically occurs after activation of the electric device.

It is important to note that the system according to the disclosure and its preferred aspects as described above can be realized in different forms. Basically, it can be provided by one or more apparatuses installed at or being directly connected to the vehicle, it can be provided by a server system which is directly or indirectly communicably connected to the vehicle and monitors the vehicle during traveling on the basis of received information from the vehicle, or it can be provided by a combination of the above mentioned apparatuses installed at or being directly connected to the vehicle and a server system which is directly or indirectly communicably connected to the vehicle and monitors the vehicle.

Specifically, according to an aspect of the present disclosure, the system may include an on-board apparatus being mountable to the vehicle. Then, the on-board apparatus may include at least one of the position monitoring unit, the required electric power amount estimating unit, the electric power amount estimating unit, and the shortage risk estimating unit. Alternatively, according to another aspect of the present disclosure, the system may include an external apparatus, such as a server or a server network, being communicably connectable with a communication unit of the vehicle. Then, the external apparatus may include at least one of the position monitoring unit, the required electric power amount estimating unit, the electric power amount estimating unit, and the shortage risk estimating unit. As a combined system, according to yet another aspect of the present disclosure, the system may include an on-board apparatus being mountable to the vehicle and an external apparatus having a communication unit being communicably connectable with a communication unit of the vehicle. Then, the on-board apparatus is preferably configured to communicate with the external apparatus and preferably including at least one of the position monitoring unit, the required electric power amount estimating unit, the electric power amount estimating unit, and the shortage risk estimating unit. On the other hand, the external apparatus is preferably configured to communicate with the on-board apparatus and includes the other unit of the position monitoring unit, the required electric power amount estimating unit, the electric power amount estimating unit, and the shortage risk estimating unit.

Summarizing, the system may be rendered by or include one or more apparatuses, e.g., apparatuses such as an on-board apparatus of an electrically driven vehicle, an information providing/information obtaining/information processing server communicably connectable to an electrically driven vehicle and/or to an on-board apparatus of an electrically driven vehicle, and/or a personal device communicably connectable to an electrically driven vehicle and/or to an on-board apparatus of an electrically driven vehicle, such as a mobile phone, a smartphone, a personal computer, a tablet computer, or the like.

According to another preferred aspect of the present disclosure, determining or even monitoring the position of the vehicle may include repeatedly determining the position of the vehicle, in particular periodically determining the position of the vehicle, or determining the position of the vehicle on the basis of events dynamically occurring during travelling (event-triggered); estimating the required electric power amount may include repeatedly estimating the required electric power amount, in particular periodically estimating the required electric power amount, or on the basis of events dynamically occurring during travelling (event-triggered); estimating the remaining power amount of the power source may include repeatedly estimating the remaining electric power amount, in particular periodically estimating the remaining electric power amount, or on the basis of events dynamically occurring during travelling (event-triggered); and/or estimating the estimated risk of electric power amount shortage may include repeatedly estimating the estimated risk of electric power amount shortage, in particular periodically estimating the estimated risk of electric power amount shortage, or only on the basis of events dynamically occurring during travelling (event-triggered).

The present disclosure further may provide a computer program product including a computer program code unit being configured to adapt an apparatus such as a computer, a server, an on-board unit, a mobile unit, in particular an apparatus which includes a sending unit, a receiving unit, a memory unit, and/or a processing unit, or a group/system of such apparatuses being communicably connectable, such that the apparatus or the group/system of apparatuses is configured to realize at least one of a position information obtaining unit for obtaining, during traveling, position information indicating a position of the vehicle, an electric power amount estimating unit for estimating, during traveling, a remaining electric power amount of an electric power source of the vehicle, a shortage risk estimating unit for estimating, during traveling, an estimated risk of electric power amount shortage on the basis of the estimated remaining electric power amount, and a notifying unit for notifying a user in case the estimated risk of electric power amount shortage estimated by the shortage risk estimating unit exceeds a predetermined threshold or other unit according to the above-described preferred aspects.

Such a program may be either stored by a memory unit in the apparatus or system above, in advance, or it may be introduced to a memory unit from another apparatus via any medium available for the apparatus above. The medium above is, for example, a removable memory medium or a communication medium (i.e. wired, wireless or optical network, or carrier wave and digital signal to realize the network).

Accordingly, the position information obtaining unit, the electric power amount estimating unit, the shortage risk estimating unit, the notifying unit and/or other unit of the above-mentioned aspects may be realized in terms of hardware or software and even as a computer-implemented combination of hardware and software.

DETAILED DESCRIPTION OF THE EMBODIMENTS

Preferred embodiments of the present disclosure will be described below with reference to the accompanying figures. The described features and aspects of the embodiments may be modified or combined to form further embodiments of the present disclosure. It is to be noted that the below preferred embodiments are described with reference to charging stations, where the user can charge the battery of the vehicle, embodying the support stations in the sense of the present disclosure. However, the present disclosure is not limited to support stations such as charging stations but the term support station is generally to be regarded as a location where the user may actively increase the power level available at the vehicle e.g. by charging one or more batteries and/or exchanging one or more batteries with one or more exchangeable charged batteries.

Moreover, in the following, an embodiment of the present disclosure will be described in which the system is exemplarily rendered by a combination of a on-board apparatus of an electrically driven vehicle and a server and information providing infrastructure which is communicably connected to the on-board apparatus. It is, however, to be noted that the system according to the disclosure may also be embodied by one or more on-board apparatuses without any external server infrastructure or connected to a server infrastructure for obtaining weather information, traffic information and/or support station information such as charging station information, or by a server infrastructure/information providing infrastructure including one or more server stations that are communicably connectable with an on-board apparatus of an electrically driven vehicle or directly with a in-vehicle network unit.

In the latter case, one or more unit of the system may be rendered as an information sending/receiving unit transmitting information to and/or receiving information from the vehicle during traveling. In particular, the position information obtaining unit may be rendered by an information receiving interface for obtaining, during traveling of the vehicle, position information indicating a position of the vehicle (wherein the vehicles may communicate their position information wirelessly), the electric power amount estimating unit may be rendered by a wireless information receiving interface for obtaining, during traveling of the vehicle, information indicating an estimated remaining electric power amount of an electric power source of the vehicle, and/or the notifying unit may be rendered by a wireless information sending interface sending notification information to the vehicle for notifying a user of the vehicle in case the estimated risk of electric power amount shortage estimated by the shortage risk estimating unit exceeds a predetermined threshold.

Figure 1:
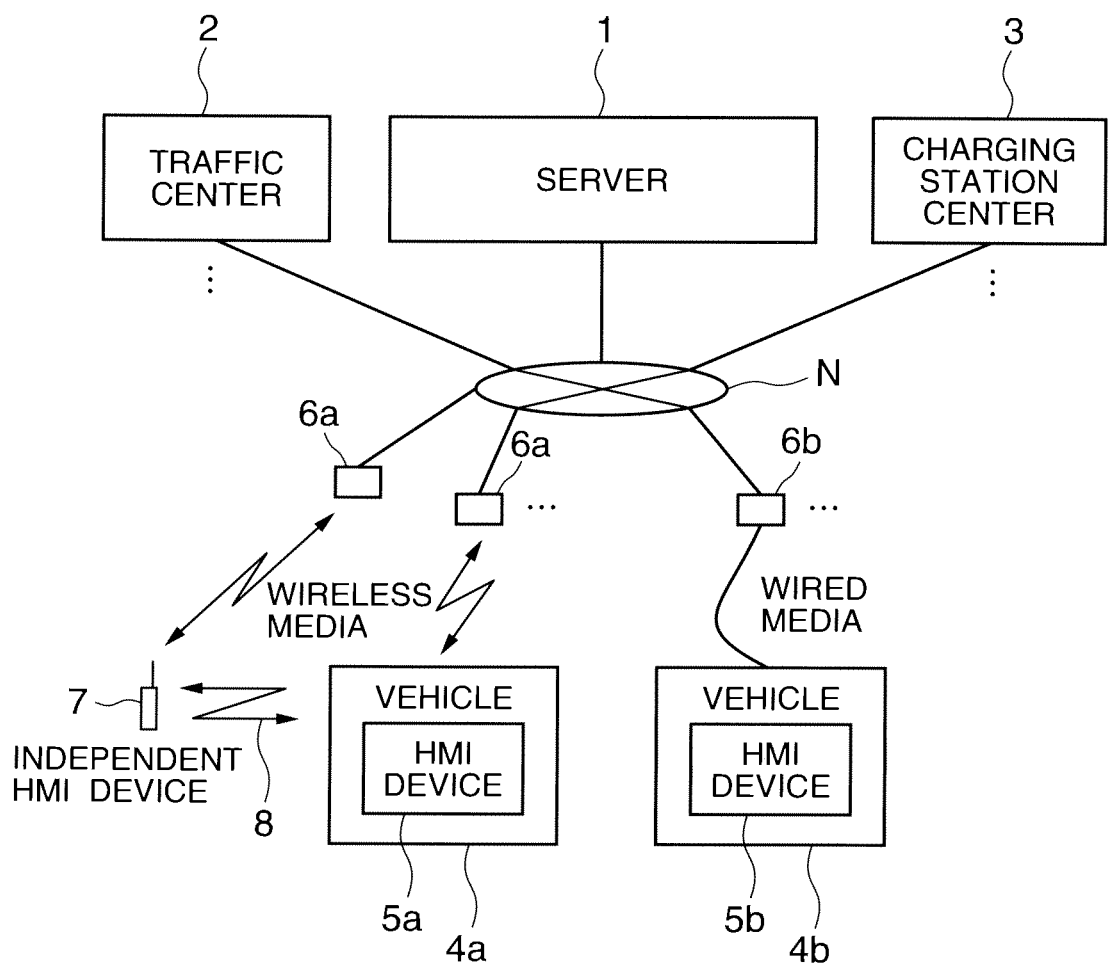
FIG. 1 is an exemplary and schematic view of a communication network.

FIG. 1 exemplarily shows a general overview over a communication system according to an embodiment of the present disclosure, the communication system involving one or more electric vehicles or plug-in hybrid electric vehicles. The communication system includes a server system 1, a traffic information center (or even a plurality of traffic information centers), a charging station center 3 (or even a plurality of charging station centers) and a plurality of electric vehicles 4a and 4b, each including an on-board apparatus 5a and 5b, respectively, which may contain respective HMI devices (human machine interface devices).

Exemplarily, the communication system further includes a mobile unit 7 which may be carried by a driver or co-driver of an electric vehicle, such as a personal computer, a smart phone, a tablet computer or the like (i.e. an independent HMI device).

The on-board apparatuses 5a and 5b are communicably connected with the server system 1, the traffic information center 2, the charging station center 3 via a communication network N. For example, the vehicle 4a and the mobile unit 7 are wirelessly connected to the network N via wireless communication interfaces 6a while the vehicle 4b is exemplarily connected to the network N via a linked connection to the communication interface 6b (such situations may be provided, for example, at a charging station when the vehicle 4b is being charged, e.g. via a so-called power line connection also referred to as PLC). Moreover, as indicated by the arrows 8, the mobile unit 7 may be wirelessly (or also by wire) connected to the on-board apparatus 5a of the vehicle 4a.

In particular, the server system 1 may be communicably connected to the traffic information center 2 and to the charging station center 3 through the communication network N (which may include one or more communication technologies such as WiFi, LAN, SAN, wireless and/or non-wireless ad-hoc networks and potentially including connections via the internet).

The server system 1 may particularly be configured to send and/or receive data through the network N to/from the traffic information center 2 and the charging station center 3. The on-board apparatuses 5a and 5b equipped in the vehicles 5a and 5b, respectively, and the mobile unit 7 may be communicably connected to the server system 1 (again through the network N which may include connections via the internet as mentioned above). Such connections may be rendered indirectly or directly, via wireless media such as, e.g. cellular communications and/or WiFi, or via wired media such as, e.g., PLC (power line communication).

The traffic information center 2 is configured to provide traffic information and may, for example, be rendered by a system owned by road operators or traffic information service providers, and may be configured to manage road traffic related information collected from roadside sensors and/or vehicles through a communication network. The traffic information center is configured to provide the traffic-related information to the server through the network N.

It is to be noted that the traffic-related information can be low context data like raw sensor data and/or high context data like road work information, traffic jam information and/or estimated travelling times between respective location points. The traffic information may also include historical traffic information including statistically evaluated traffic information depending on time, date, season, weather or the like.

The charging station center 3 is configured to provide charging station information and may, for example, be rendered by a system owned by a charging station operator, which may be configured to manage and/or monitor the status of the operator's charging stations. The charging station center 3 is configured to provide status information of related charging stations (such as information on position, availability, number and power of charging units or the like) to the server system 1 and the charging station center 3 may further operate as an interface enabling making and/or canceling a reservation for one or more charging stations through the connected network N.

Figure 2:
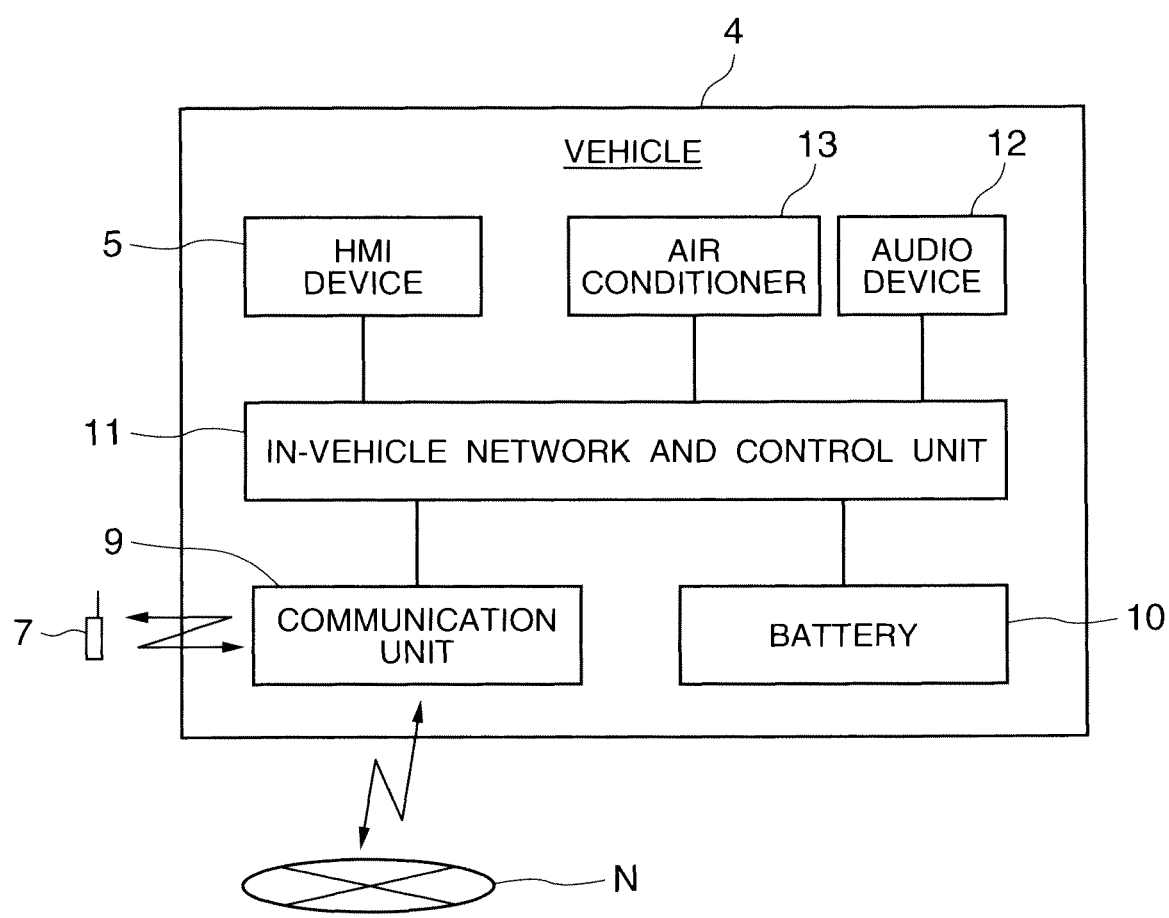
FIG. 2 is an exemplary and schematic view of a vehicle according to an embodiment.

FIG. 2 shows an exemplary and schematic view of an electrically driven vehicle 4 according to an embodiment of the present disclosure. The electrically driven vehicle 4 is an electric-based vehicle such as an electric vehicle (EV) or a plug-in hybrid electric vehicle (PHEV) including a chargeable battery 10 (or a system of a plurality of batteries) as an electric power source. The vehicle includes an on-board apparatus 5 (also sometimes referred to as an HMI device), a communication unit 9, in-vehicle network and a control unit 11, additional electric devices such as an air conditioner device 13 and an audio device 12, and the battery 10 which can be used to provide electric power for driving the electrically driven vehicle 4 as well as for the electric devices 12 and 13, the communication unit 9, the on-board apparatus 5 and the in-vehicle network and control unit 9. The on-board apparatus 5 may be rendered by an on-board unit mounted to the vehicle or by an external mobile device mountable and connectable to the vehicle or which is brought to the vehicle by the driver or a passenger of the vehicle (e.g. a PDA, a mobile phone such as a smartphone or the like).

The in-vehicle network and control unit 9 is configured to provide a connection such as a bus for communication between internal equipments of the vehicle 4 to communication, according to a certain policy. For example, the in-vehicle network and control unit 9 may include a CAN (controller area network) system, a TTP (time-triggered protocol) system and/or a FlexRay system.

The communication unit 9 is configured for sending to and receiving data from external devices through one or more communication media such as, e.g., cellular, Bluetooth, WiFi, PLC (power line communication) or the like. The communication unit 9 may be realized by an independent communication module like a Telematics Control Unit (TCU), as well as by being attached directly to specific devices such as the on-board apparatus 5. As exemplarily illustrated in FIG. 2, the communication unit 9 may enable communications via the network N (e.g. to other vehicles, to the server system 1, the traffic information center 2, the charging station center 3 or the like) or directly to a mobile unit 7 via a wireless (or wired) connection.

The on-board apparatus 5 is configured to allow the users (e.g. the driver and/or other passengers of the vehicle) to operate and/or control the vehicle-related devices such as a navigation device and/or vehicle-related information services, such as a navigation services or commercial services that may be provided via the network N, for example. According to an embodiment, the on-board apparatus 5 may be configured to obtain battery information via the in vehicle network and control unit 11, and it is further configured to communicate with external devices, for example with the server system 1, the traffic information center 2 and/or the charging station center 3, via the communication unit 9 and the network N to which the communication unit 9 can be communicably connected.

In particular, according to embodiments of the present disclosure, the on-board apparatus 5 may render a system that includes a position information obtaining unit for obtaining, during traveling of the vehicle 4, position information indicating a position of the vehicle 4 (e.g. via a satellite positioning system such as GPS or GALILEO), an electric power amount estimating unit for estimating, during traveling of the vehicle 4, a remaining electric power amount of the battery 10 as an electric power source of the vehicle 4, a shortage risk estimating unit for estimating, during traveling of the vehicle 4, an estimated risk of electric power amount shortage on the basis of the estimated remaining electric power amount, and a notifying unit such as a display unit or other human machine interface unit for notifying a user in case the estimated risk of electric power amount shortage estimated by the shortage risk estimating unit exceeds a predetermined threshold. The on-board apparatus 5 may further include a speed and/or velocity information obtaining unit for obtaining, during traveling of the vehicle 4, speed and/or velocity information indicating a speed and/or velocity of the vehicle 4, and/or a navigation information obtaining unit for obtaining navigation information for the purpose of route navigation calculations, i.e. information such as road network information, map information.

On the other hand, an HMI device, which is embodied by the on-board apparatus 5 above, is not necessarily to be directly equipped in the vehicle 4. Alternatively, there may be provided an independent HMI device such as a mobile unit 7, which is not directly equipped in the vehicle 4, but can be carried by the driver or another passenger of the vehicle 4 as another device that may provide a user the functionality of accessing the vehicle-related information services similarly to the above-described on-board apparatus 5. For example, a PND (Portable Navigation Device), a cellular phone, a smart phone, a personal computer, or a tablet computer may be configured such as to operate as an HMI device which may additionally be capable of providing navigation services. Such an independent HMI device 7 may be communicably connected to the in-vehicle system via the communication unit 9 equipped in the vehicle 4, for communication and cooperation with the internal equipments of the vehicle such as the battery 10 and the electric devices 12 and 13.

In particular, such an independent HMI device (mobile device 7) may, according to embodiments of the present disclosure, render a system that includes a position information obtaining unit for obtaining, during traveling of the vehicle 4, position information indicating a position of the vehicle 4 and/or the HMI device 7 itself (e.g. via a satellite positioning system such as GPS or GALILEO), e.g. by being carried by the driver or another passenger of the vehicle 4, an electric power amount estimating unit for estimating, during traveling of the vehicle 4, a remaining electric power amount of the battery 10 as an electric power source of the vehicle 4 (e.g. via a connection through the communication unit 9), a shortage risk estimating unit for estimating, during traveling of the vehicle 4, an estimated risk of electric power amount shortage on the basis of the estimated remaining electric power amount, and a notifying unit such as a display unit or other human machine interface unit for notifying a user in case the estimated risk of electric power amount shortage estimated by the shortage risk estimating unit exceeds a predetermined threshold.

The server system 1 is, like a telematics service center, a server system of one or more servers that provides services to the driver or the passengers of the vehicle via the HMI device (such as on-hoard apparatus 5 and/or a mobile unit 7) being equipped in or connected to the vehicle 4. The server system 1 can be composed of a plurality of servers, which may be located at one place or geographically distributed.

Figure 3:
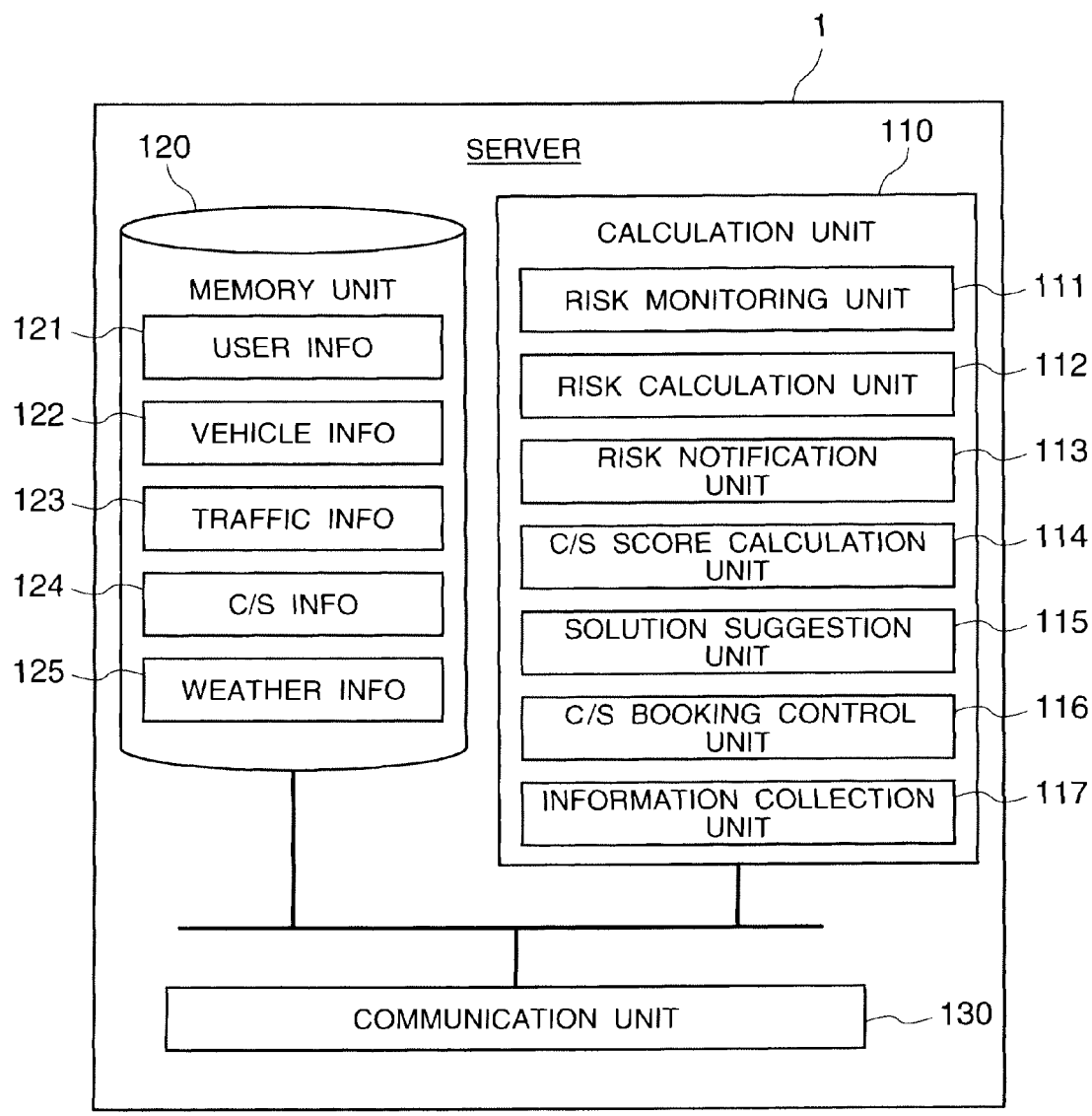
FIG. 3 is an exemplary and schematic view of a server unit according to an embodiment.

The server system 1 according to an embodiment of the present disclosure is exemplarily and schematically illustrated in FIG. 3. The server system 1 of FIG. 3 includes a calculation unit 110 which is configured to process data (such as a processing unit); a memory unit 120 which is configured to store data indicating information such as, e.g., data indicative of user information 121 on a user of an electrically driven vehicle 4 (e.g. stored preference data of a certain user or the like), data indicative of vehicle information 122 on the vehicles, data indicative of traffic information 123 (e.g. data received from the traffic information center 2 and/or obtained directly by means of traffic sensors connected to the server system 1), data indicative of charging station information 124 (e.g. data received from the charging station center 3), and/or data indicative of weather information 125 (e.g. data received from a weather information providing server and/or obtained directly by means of weather sensors or weather stations connected to the server system 1); and a communication unit 130 enabling the server system 1 to be communicably connected via the network N as, for example, indicated in FIG. 1. The communication unit 130 allows the server system 1 to communicate through the connected network N with the other devices or systems. For example, the communication unit 130 may be realized by an Ethernet module.

The calculation unit 110 according to the embodiment is configured to estimate, during traveling of the vehicle 4, an estimated risk of electric power amount shortage on the basis of the estimated remaining electric power amount, thereby embodying the shortage risk estimating unit. Then, the communication unit 130 of the server system 1 may be regarded as embodying the position information obtaining unit for obtaining, during traveling, position information indicating a position of the vehicle and the electric power amount estimating unit for estimating, during traveling, a remaining electric power amount of an electric power source of the vehicle since the required information indicating the position of the vehicle 4 and the power level of the battery 10 can be obtained via the communication unit 130 through the network N from the vehicle 4. Also, the communication unit 130 of the server system 1 may be regarded as embodying the notifying unit for notifying a user in case the estimated risk of electric power amount shortage estimated by the shortage risk estimating unit exceeds a predetermined threshold since the server system 1 may transmit such a notification to the user of the vehicle 4 via the communication unit 130 through the network N.

According to the embodiment, the server system 1 repeatedly or even periodically or by means of event-triggering monitors the risk of battery shortage of the vehicle 4 based on the vehicle information 122 received from the vehicle 4 which indicates the battery status of the vehicle 4, the destination location of the vehicle 4, and/or the current location 4 of the vehicle, and optionally on the further basis of other types of information including the charging station availability and position information 124, the weather information 125 and/or the traffic information 123

Once a risk of battery shortage is detected by the calculation unit 110, the server system 1 informs the driver and/or the passengers of the vehicle 4 of the risk via the communication unit 130 through the network N and, according to preferred modified embodiments, even may autonomously suggest the one or more available places and/or timings for a battery charge to the user and/or it may autonomously suggest alternative routes to a destination which may reduce the risk of occurrence of a battery shortage.

As exemplarily and schematically illustrated in FIG. 3, the calculation unit 110 according to the embodiment includes a risk monitoring unit 111, a risk calculation unit 112, a risk notification unit 113, a charging station score calculation unit 114, a solution suggestion unit 115, a charging station booking control unit 116 and an information collection unit 117. The calculation unit 110 may be rendered by software, hardware or a combination thereof.

The risk monitoring unit 111 is configured to repeatedly (or even periodically or on the basis of event-triggering) check if the risk of a battery shortage of the vehicle 4 and/or the risk of being delayed in reaching a booked charging station at a reservation time is higher than a pre-determined threshold. The risk calculation unit is configured to calculate the risk of battery shortage of the vehicle 4 and/or the risk of being delayed in reaching the booked charging station at the reservation time or at an intended arrival time specified by the user, based on the information which is available in the memory unit 120. The risk notification unit 113 is configured to issue a notification to the driver and/or the passengers of the vehicle 4 via the communication unit 130 through the network N and via an HMI device (e.g. via an HMI of the on-board unit 5 and/or via an HMI of the mobile unit 7) being equipped in or being connected to the vehicle 4, based on the information on the risk as calculated by the risk calculation unit 112, i.e. in case of a detected battery shortage risk or a detected risk of a delay.

Furthermore, in case of a detected battery shortage risk or a detected delay risk, the charging station score calculation unit 114 is configured to calculate a score value for one, more or even each of the charging station candidates indicated in the charging station information 124 on the basis of availability, position, available facilities (e.g. if the charging station provides a quick charger unit for quick charge and/or normal charger units) and potentially also on the basis of user preferences for each charging station candidate indicated in the user information 121 based on the user's pre-defined preferences or by means of a dynamically generated user profile (e.g. by machine learning).

The solution suggestion unit 115 is configured to indicate one or more suggested charging station candidates in connection with a potential solution to the detected risk, for example, based on the scores calculated by the charging station score calculation unit 114.

The charging station booking control unit 116 is configured to make a reservation and/or cancel a reservation in connection with a charging station candidate according to a request from the user, on behalf of the user, e.g. if the user selects one or more of the suggested charging station candidates.

The information collection unit 117 is to periodically or repeatedly collect the information 121 to 125 via the communication unit 130 and to store it in the memory unit 120. In the memory unit 130, user information 121, vehicle information 122, traffic information 123, charging station information 124 and weather information 125 is stored.

The user information 121 may include a user ID for the services provided by the server system 1, charging station user information which allows the server system 1 to perform charging station reservation activities on behalf of the user such as preference information and/or login information, a vehicle ID associated with the user, the associated HMI device information, the charging station preference parameters being used for the charging station score calculation, a monitoring mode flag to check if the monitoring mode is active or not, selected risk monitoring items (e.g. whether the server system 1 shall monitor a delay risk and/or a battery shortage risk) and so on. In general, the risk monitoring items may represent the risk types that the server needs to monitor for the user. For example, the risk monitoring items may contain risks such as traffic jam, battery shortage, and delayed arrival at the destination.

The vehicle information 122 may include information on the battery status (e.g. information on an available energy supply level and/or a deterioration of the battery 10), the constant drag (Cd) value of the vehicle, the weight of the entire car, the air pressure of the tires, the electricity devices usage status (e.g. the electric energy consumption level of internal devices of the vehicle 4 such as the air conditioner 13 and the audio device 12), the electricity mileage (e.g. the remaining travelable distance based on the battery status, the electricity devices usage status, map information and/or road information), the current location of the vehicle 4 and/or, optionally, the destination location.

The traffic information 123 may include traffic jam information, traffic accidents information, road works information, travelling time information etc. Such traffic information 123 may be collected from the traffic information center 2 via the network N, and/or it may be determined by the server system 1 based on roadside sensor information and/or vehicle driving information collected from the traffic information center 2, the roadside sensors and/or the vehicles 4a, 4b through the network N.

The charging station information 123 may include, for one or more charging stations, information on the location, charging equipment information (e.g. which types of charging units and how many charging units are provided at the charging station), availability information (e.g. information on which charging units are available during which time periods or at which times) and/or booking functionality information on the respective charging stations.

Specifically, the charging equipment information may specify how many normal charging units and/or quick charging units are equipped, wherein such information may be used for the calculation of a necessary time for charging the battery 10 of the vehicle 4. The availability information may specify when and how many of each type of charging units are available. The booking functionality information may specify if a charging station provides the functionality for making reservations/cancelling reservations of charging units via the network N, and if yes, it may further provide the booking Interface information that is necessary for handling a booking procedure for making reservations/cancelling reservations of charging units via the network N.

The weather information 125 may include information indicating the current weather condition, such as e.g. rain, snow, wind, temperature, for one or more regions, and it may also provide the future weather forecast for one or more regions or spots. The weather information 125 may be collected via the network N, for example, from weather information providing server infrastructure connected to the network N and/or from Internet sites providing the regional weather information and/or spot weather information.

It is to be noted that the above-described unit such as the communication unit 9, 130, and 230, the memory unit 120 and 220, the calculation unit 110 and 210, the risk monitoring unit 111, the risk calculation unit 112, the risk notification unit 113, the charging station score calculation unit 114, the solution suggestion unit 115, the charging station booking control unit 116, the information collection unit 117, the vehicle status check unit 211, the position determining unit 212, the vehicle into sending unit 213, the HMI control unit 214, and/or the navigation unit 215 may be realized by software and/or hardware. In particular, the above-mentioned unit and respective functions may be implemented, for example, by causing one or more CPUs to execute one or more predetermined corresponding programs on the basis of stored data, e.g. the programs /and/or data being loaded from an external storage apparatus onto a storage memory. Such programs may be previously stored in the memory unit 120 and 220 or in an external storage device, or may be loaded when necessary from another apparatus via an additional interface unit or via a communication unit (such as one or more of the communication unit 9, 130, and 230.

Figure 4:
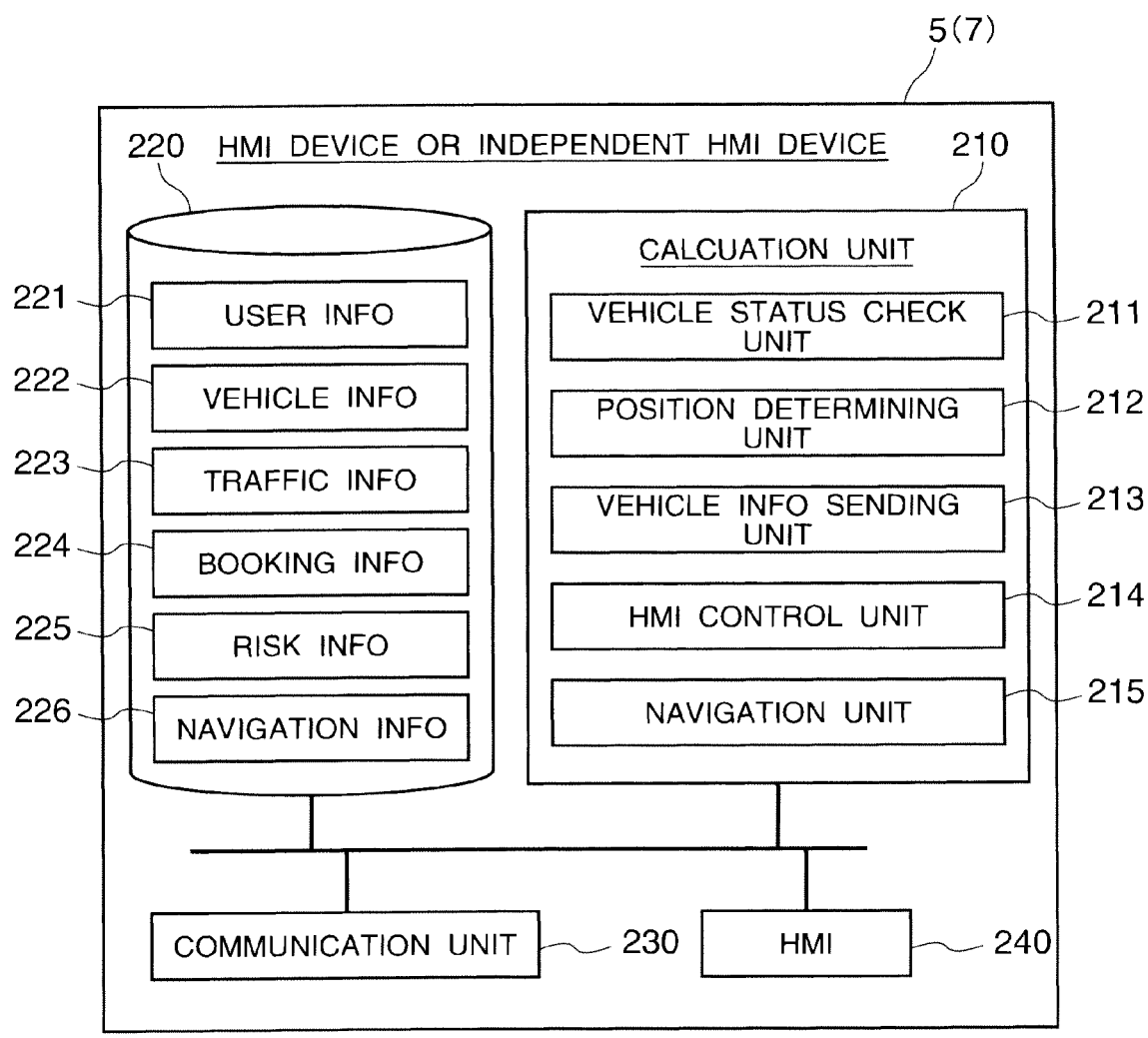
FIG. 4 is an exemplary and schematic view of an HMI unit according to an embodiment.

A HMI device (such as, e.g., the on-board unit 5 or the mobile unit 7) according to an embodiment of the present disclosure is exemplarily and schematically illustrated in FIG. 4. The HMI device 5 (or 7) of FIG. 4 includes a calculation unit 210 which is configured to process data (such as a processing unit); a memory unit 220 which is configured to store data indicating information such as, e.g., data indicative of user information 221 on a user of an electrically driven vehicle 4 (e.g. stored preference data of a certain user or the like), data indicative of vehicle information 222 on the vehicle 4, data indicative of traffic information 223 (e.g. data received from the server system 1, the traffic information center 2 and/or obtained directly by means of traffic sensors connected to the HMI device), data indicative of booking information 224 related to reservations for one or more charging stations, data indicative of risk information 225 indicating a selection of risk types to be monitored and/or data indicative of navigation information 226 including navigational map data and, optionally, additional information about one or more selected routes including information on a destination position; and a communication unit 230 enabling the HMI device to be communicably connected via the network N as, for example, indicated in FIG. 1

As mentioned above, the memory unit 220 is configured to store data indicative of user information 221, data indicative of vehicle information 222, data indicative of traffic information 223, data indicative of booking information 224, data indicative of risk information 225 and data indicative of navigation information 226.

The user information 221 may include a user ID for the services provided by the server system 1, configuration parameters for the services or the like. The vehicle information 222 may include a vehicle ID, the battery status and the electricity devices energy consumption status determined by the vehicle status check unit 211, the current geographical location determined by the position determining unit 212, the speed and/or velocity of the vehicle 4, or the like. The traffic information may include 223 traffic jam information, traffic accidents information, road works information, travelling time information, or the like, which may be received from the server system 1 and/or from the traffic information center 2 through the network N.

The booking information 224 may include the location and the reserved time slot of one or more reserved charging stations, i.e. charging stations for which a reservation has been booked. The risk information 225 may indicate a list of risks to be monitored, e.g. risks including a risk of a battery shortage, a risk of being delayed in reaching the booked charging station at a reserved time slot, and/or a risk of being delayed in reaching a destination specified by the user at an arrival time specified by the user. The booking information may be sent from the server system 1 or the charging station center. The navigation information 226 may include map data and the destination location for navigational purposes.

The calculation unit 210 according to FIG. 4 exemplarily includes a vehicle status check unit 211, a position-determining unit 212, a vehicle information sending unit 213, a HMI control unit 214 and a navigation unit 215.

The vehicle status check unit 211 is configured to repeatedly or even periodically check the vehicle status through the in-vehicle network and control unit 11, wherein the vehicle status may include, for example, the battery status of the battery 10, the speed and/or velocity of the vehicle 4, the electric consumption status of the electric devices 12 and 13 in the vehicle 4 and the like.

The position determining unit 212 is configured to determine geographical position information. The position-determining unit 212 may include a satellite positioning system module which may determine a current location by means of a satellite positioning system such as GPS or GALILEO. The position determining unit 212 may be integrated into the HMI device as shown in the embodiment of FIG. 4, or it may be independently connected to the in-vehicle network so as to be accessible through the in-vehicle network and control unit 11.

The vehicle information sending unit 213 is configured to control the communication unit 230 so as to periodically send at least part of the vehicle status information obtained by the vehicle status check unit 211 and the geographical position information obtained by the position determining unit 212 to the server system 1 through the network N.

The HMI control unit 214 is configured to control the output and the input of the HMI device via the human interface unit 240. The human machine interface unit 240 may include an output unit for outputting information to the user which may include a display unit for displaying information to the user, a sound output interface unit for outputting information by sound, and/or a voice output interface unit for outputting information by voice. Furthermore, the human machine interface unit 240 may include an input unit for inputting information by the user which may include an input unit such as a keyboard unit, buttons, a rotary knob and/or a touch screen.

The navigation unit 215 is configured to provide the navigation services to the user of the vehicle 4 based on the navigation information 226 and the traffic information 223. For example, the navigation unit 215 may include a route calculation unit for calculating travel routes from a starting position to a destination position, wherein the starting position and the destination position may be input by the user via the human machine interface unit 240. Also, the starting position may be the current position determined by the position determining unit 212 or a position of a charging station indicated in the booking information 224 and/or the charging station information 124, when received from a charging station center or from the server system 1. The route calculation unit may be further configured to estimate travel times for a calculated route based on the navigation information 226, the traffic information 223 and/or the user information 221 if the information indicates parameters relating to the average driving behavior of the driver of the vehicle 4.

Figure 5:
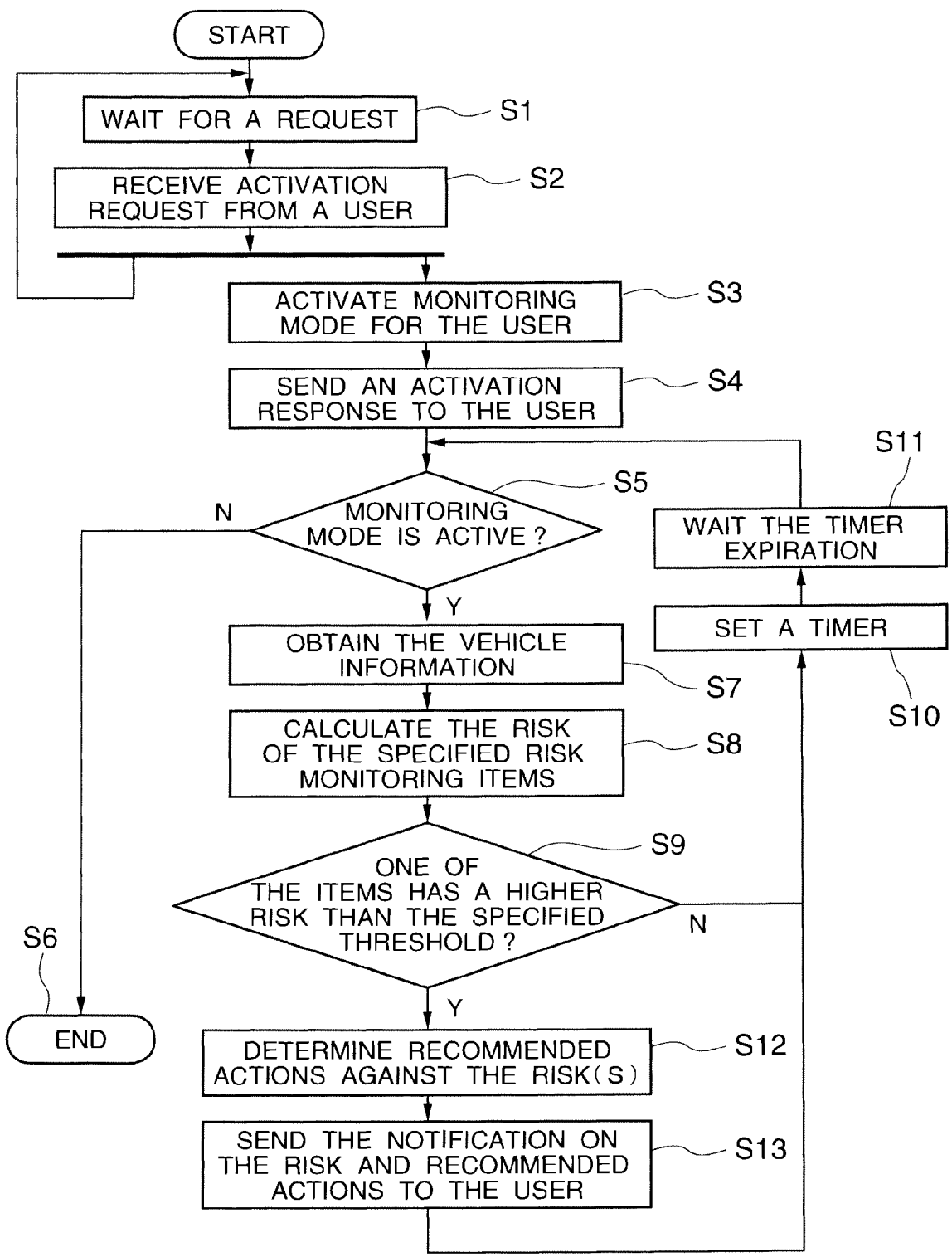
FIG. 5 is an exemplary and schematic view of a flow chart of a method for supporting a user of an electrically driven vehicle at a server side according to an embodiment.

FIG. 5 exemplarily and schematically shows a method of supporting the user of an electrically driven vehicle 4, wherein, in FIG. 5, the method steps are exemplarily performed at a server side, e.g. at a server system 1 as illustrated in FIG. 2.

First, the server system 1 waits for a request from the user to be received via the network N through the communication unit 130 (step S1). When the server system 1 receives an monitoring mode activation request from the user via the communication unit (step S2), the server system 1 initiates a process for risk monitoring for the user according to the monitoring mode activation request received from the user in step S1.

The monitoring mode activation request may contain a user ID identifying the requesting user, authentication data for authenticating the user and the user's request, a vehicle ID identifying the vehicle 4 in which the user is traveling, and the risk monitoring items to be monitored. The monitoring mode activation request may further contain source HMI device information such as a source IP address of the HMI device used by the user (e.g. on-board unit 5 or mobile unit 7) and charging station preference parameters indicating user's preferences relating to booking of one or more charging stations. Some of the above-mentioned information may be also preregistered in the memory unit 120 of the server system 1 in advance by the user. In that case, the request does not necessarily need to include such information into the monitoring mode activation request.

After the initiation of the risk monitoring process by activating the monitoring mode according to the monitoring mode activation request (step S3), the original process goes back to step S1 in order to wait for another request from the user such as a modified monitoring mode activation request or a monitoring mode deactivation request. The step S3 may additionally include a user authentication in order to check whether the requesting user subscribed the requested monitoring service or not, and it may further check whether the user ID is associated with the vehicle ID based on information stored in the memory unit 120 of the server system 1.

In addition, the process continues with step S4 in which the server system 1 sends a response to the HMI device of the user for informing him about the result of step S3. For example, the server system 1 may issue a response indicating that the received monitoring mode activation request has been received or even indicating whether the received monitoring mode activation request is granted or denied on the basis of the user authentication.

In step S5, it is determined whether the monitoring mode is activated or not, and if the result is no, the process ends (step S6). However, if the monitoring mode is activated (step S5 gives yes as a result), the process continues with step S7 in which vehicle information of the associated vehicle 4 is obtained from the vehicle 4 and/or from the memory unit 120.

It is to be noted that step S7 can be realized in different ways. For example, the server system 1 may send a request to the HMI device (e.g. on-board unit 5 or mobile unit 7) or to other in-vehicle equipment devices, which manages the vehicle information in the vehicle 4, so as to then receive the requested vehicle information from the vehicle 4 in response to the request. According to another example, the HMI device or the vehicle may periodically send the vehicle information to the server system 1 without any request. The server system may then receive the vehicle information and use it to update the vehicle information 122 stored in the memory unit 120 from which is may be obtained in step S7.

After obtaining the vehicle information (step S7), the process continues with a step S8 of calculating the risk of occurrence of risk monitoring items specified in the received monitoring mode activation request. The risk monitoring items may include, for example, occurrence of a traffic jam, occurrence of a battery shortage, and the occurrence of a delayed arrival at the set destination, which may represent the location of a charging station for which a reservation has been made for a specific time slot. As the result of the risk calculation, a quantified value which indicates the calculated risk for the occurrence of a risk monitoring item (such as a percentage level of risk of the occurrence of a risk monitoring item) or classified types expressing the level of the calculated risk for the occurrence of a risk monitoring item is output for each selected risk monitoring item.

For example, if the occurrence of a traffic jam is selected as a risk-monitoring item, the risk calculation unit 112 determines if there is a risk of the occurrence of a traffic jam on the route to the destination, or if there is the possibility that traffic jam will happen around the estimated passing time, based on the traffic information 123 (which may relate to real-time traffic information and/or statistical traffic information).

If the occurrence of a battery shortage is selected as a risk-monitoring item, for example, the risk calculation unit 112 determines the estimated battery consumption when traveling to the destination, e.g., based on the driving distance of the route from the current position and the position of the destination and estimated travelling time from the current position of the vehicle 4 to the destination position, the electricity mileage of the vehicle 4, the electricity devices usage of the electric devices (e.g. devices 12 and 13) of the vehicle 4 and/or the weather information 125.

If the occurrence of a delayed arrival at the destination is selected as a risk-monitoring item, for example, risk calculation unit 112 determines the estimated travelling time from the current position of the vehicle 4 to the destination position and checks whether the vehicle can reach the destination on time based on the estimated travelling time and a current time.

In the next step S9, it is determined by the risk monitoring unit 111 whether one or more of the selected risk monitoring items have a calculated risk exceeding a specified threshold. If the calculated risk for each selected risk monitoring item is below the respective specified threshold (step S9 returns no), the process gets into the waiting phase and then repeats the steps S5 to S9 after the waiting phase. According to the embodiment of FIG. 5, a timer is set to wait (step S10) and the server system 1 waits (step S11) for the timer expiration until the next round of the risk check (S11). Accordingly, the steps S5 to S9 may be performed repeatedly or even periodically in order to dynamically monitor all selected risk monitoring items.

However, if at least one of the selected risk monitoring items has a calculated risk that exceeds the respective specified threshold (step S9 returns yes), the process goes to the next step S12 in which the solution suggestion unit 115 determines one or more recommended solutions available for trying to avoid the occurrence the respective risk monitoring item for which the calculated risk exceeds the specified threshold.

For example, if the risk of occurrence of a traffic jams is determined to exceed a pre-determined threshold in step S9, the solution suggestion unit 115 may calculate one or more alternative routes from the current position to the destination position and the estimated travelling time for the calculated alternative routes, and, set the alternative route which requires the smallest travelling time and/or the smallest battery consumption among all calculated alternative routes and which requires less travelling time than the currently set route as the recommended solution.

On the other hand, if the risk of the occurrence of a battery shortage is determined to exceed a pre-determined threshold in step S9, for example, the solution suggestion unit 115 may perform a search, on the basis of the charging station information 124 and the vehicle information 122, if there exists an available charging station which can be reached by the vehicle 4 with the remaining battery level. If one or more such available charging stations can be identified on the basis of the charging station information 124 and the vehicle information 122, the solution suggestion unit 115 can set battery charging as one of the recommended solutions. Moreover, if it is determined that the main reason for the increased risk of the occurrence of a battery shortage lies in a traffic jam, road works or a traffic accident along the currently set route, the solution suggestion unit 115 can calculate one or more alternative routes from the current position to the destination position and check whether there exists an alternative route which require less battery consumption leading to a decreased risk of the occurrence of a battery shortage. If such an alternative route is found, the solution suggestion unit 115 can also set the detour route as another option of the recommended solutions.

Moreover, if the risk of the occurrence of a delayed arrival to the destination is determined to exceed a pre-determined threshold in step S9, for example, the solution suggestion unit 115 may calculate one or more alternative routes from the current position to the destination position and the estimated travelling time for the calculated alternative routes, and, set the alternative route which requires the smallest travelling time among all calculated alternative routes and which requires less travelling time than the currently set route as the recommended solution. Most appropriately, if the destination is the location of a charging station for which a reservation has been made for a specific time slot and the estimated delayed time is determined to be more than a certain threshold, the solution suggestion unit 115 can set booking update (e.g., rebooking of the reservation at the charging station, cancellation of the charging station reservation, making a new reservation at another closer charging station, or the like) as one of the recommended solutions.

After step S9, the server system 1 sends data indicating the risk information calculated in step S8 and the recommended solutions determined in step S12 to the HMI device of the user and in order to notify the user about the detected risk(s) and the corresponding recommended solutions via the human machine interface unit 240. Then, under the condition that no monitoring mode deactivation request is received at the server system 1, the process goes to the waiting phase (steps S10 and S11) in order to repeat steps S5 to S9 and potentially steps S12 and S13.

In the exemplary flowchart of FIG. 5, the main loop is triggered by a timer, but it is also possible to be triggered by events, i.e. by event-triggering. For example, if the server system 1 receives information on a traffic accident and/or a traffic jam, the server system 1 may immediately trigger the risk monitoring process after receiving the traffic accident information. By doing so, the server system 1 can advantageously dynamically react to situation changes even more quickly.

Furthermore, it is possible that the server may receive other types of requests in the step S2. For example, if the server system 1 receives a monitoring mode deactivation request relating to one or more selected monitored risk items from the corresponding user, the server system 1 may set the corresponding risk monitoring mode flag to false so that the activated risk monitoring process ends for the deactivated monitored risk items because the step S5 gives the result no.

Other than activation and deactivation of the monitoring mode, a configuration update request and an action request may be similarly handled. A configuration update request is issued when the user would like to change the configuration of the services and an action request is issued when the user would like the server system 1 to perform a specific action such as making a reservation/cancellation for a charging station or calculating an alternative route.

Figure 6:
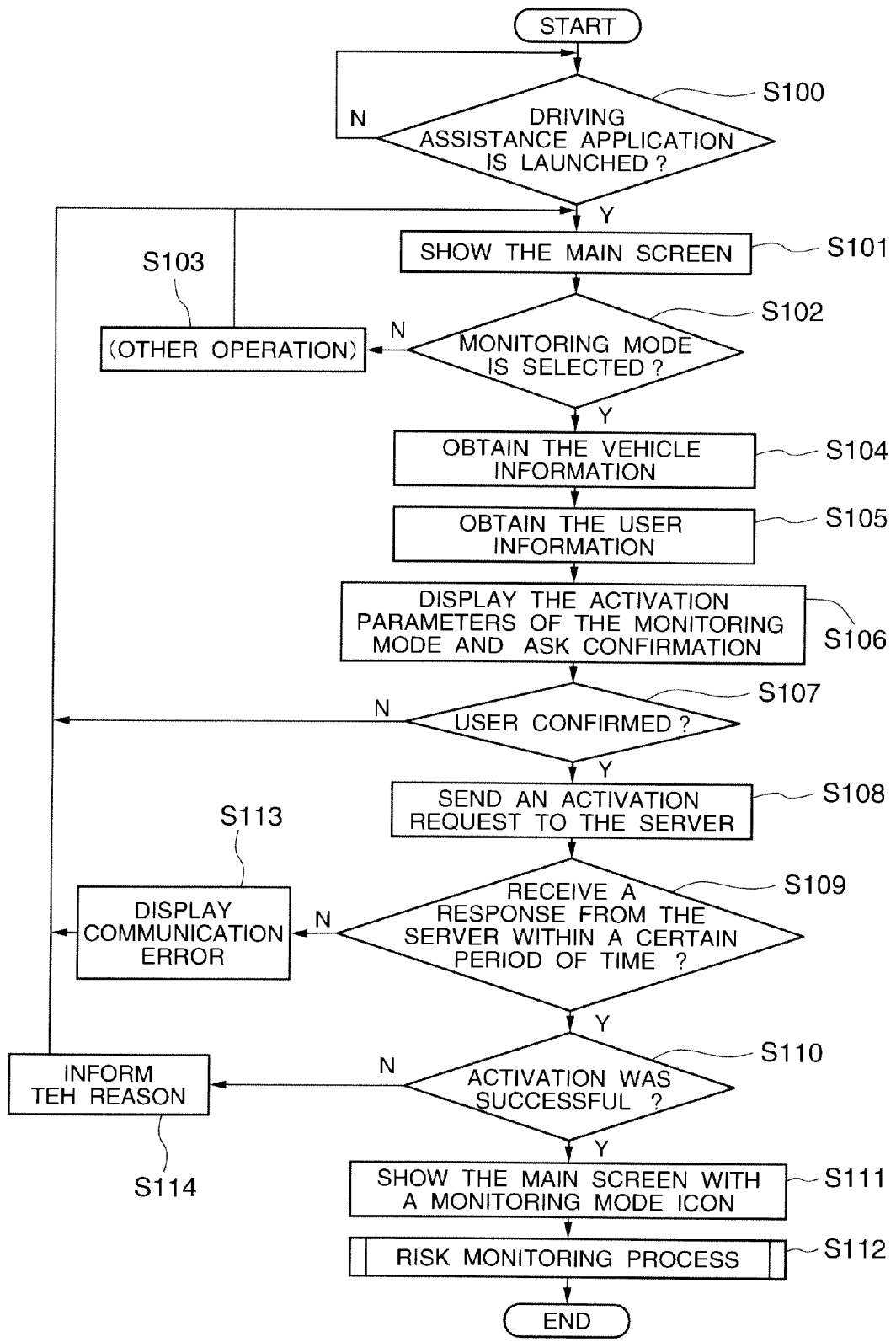
FIG. 6 is an exemplary and schematic view of a flow chart of a method for supporting a user of an electrically driven vehicle at a vehicle side according to an embodiment.

As an exemplary counterpart of the server process illustrated in FIG. 5, the HMI device (or an independent HMI device such as a mobile unit 7) may handle the interaction with the user and the server system 1 according to the exemplary and schematic method for supporting the user of an electrically driven vehicle 4 as illustrated in FIG. 6.

In the first step S100, the HMI control unit 214 checks whether a driving assistance application including a risk monitoring service, such as a navigation application as one potential example of the applications which may contain the risk monitoring service, is launched by the user or not. If not (S100 returns No), the process continues to repeat step S100 until the risk monitoring service is activated.

Otherwise, if step S100 returns yes, the human machine interface unit 240 displays a main screen of the application (step S101) to the user and provides the user with the possibility of selecting the monitoring mode including the possibility of selecting monitoring mode parameters and/or the possibility of selecting one or more risk monitoring items. If the user selects the monitoring mode in the application (step S102 returns yes), the process goes to the next step (step S104). Otherwise (S102 returns no), the HMI device may perform other operations and goes back to step S101 of displaying the main screen.

Once the monitoring mode is selected (step S102 returns yes), the vehicle status check unit 211 obtains the vehicle information 222 such as the vehicle ID, the battery status and the electric device usage status in step S104, and obtains the user information 221 such as the user ID and the configuration parameters stored for the user (step S105). Then, the HMI device via the human machine interface unit 240 shows a summary screen indicating a summary of the obtained configuration parameters of the monitoring mode in the display unit and ask the user's confirmation (step S106).

Figure 7:
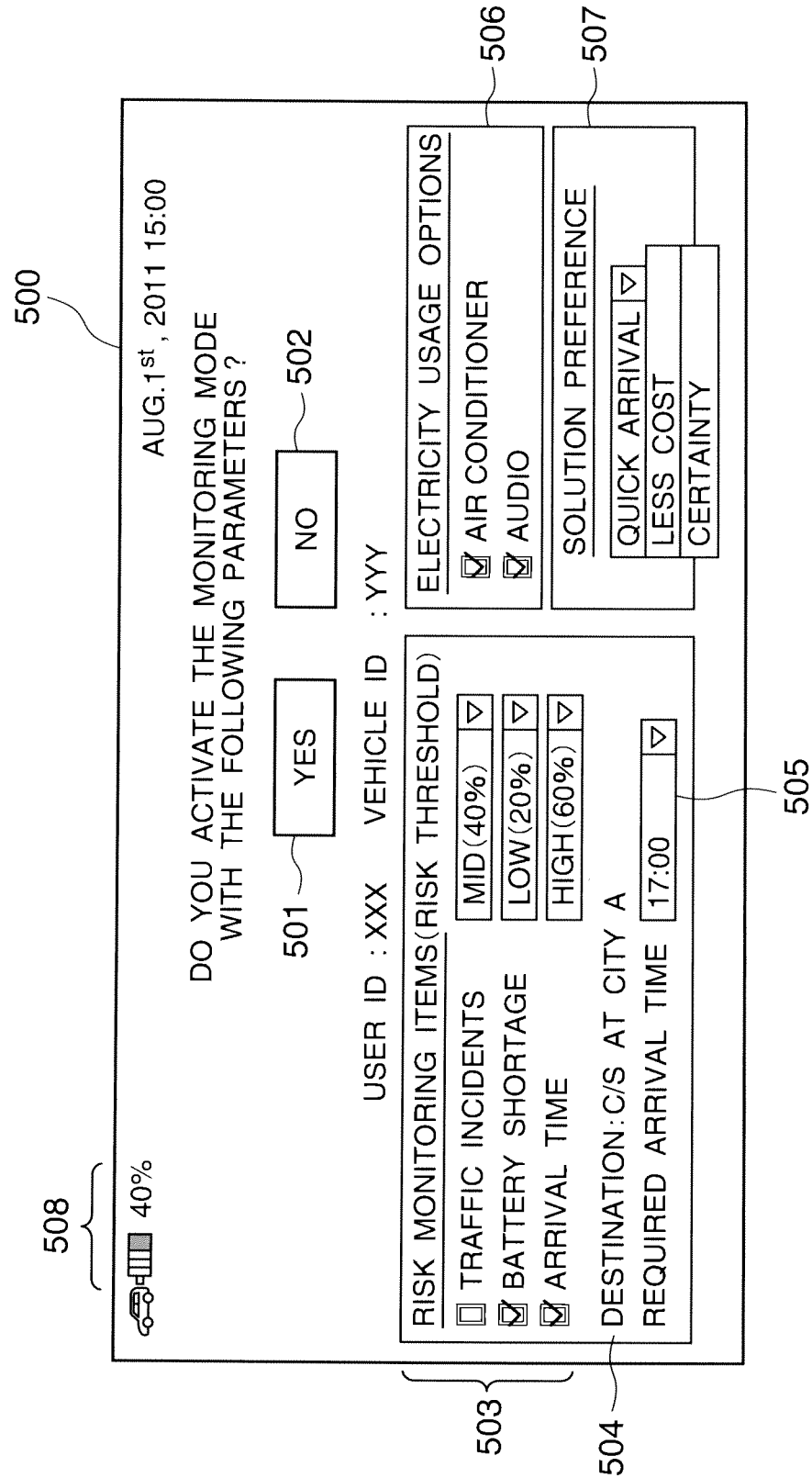
FIG. 7 is an exemplary and schematic view of a screen shown to a user of an electrically driven vehicle according to an embodiment.

In this connection, reference is made to FIG. 7 which exemplarily shows a summary screen 500 which is shown to the user via the display unit of the human machine interface unit 240. The summary screen exemplarily includes screen buttons 501 and 502 allowing the user to confirm or deny the shown summary of currently selected configuration parameters. In a screen field 503, there are shown the plural available risk monitoring items including occurrence of traffic incidents such as traffic accident, traffic jam, and road works, occurrence of a battery shortage, and occurrence of a delayed arrival time.

In the field 503, the user can select which of the shown risk monitoring items shall be monitored (currently, battery shortage and arrival time are selected) and which risk threshold values shall be used in determining whether the respective calculated risk exceeds the respective thresholds (e.g. in step S9 described above). In the summary screen 500, reference numeral 504 relates to the shown information regarding the currently set destination (e.g. a charging station at a city A) and reference numeral 505 relates to the shown information regarding the set intended arrival time at the destination to be used for the risk calculations in connection with the risk monitoring item of the occurrence of a delayed arrival.

Furthermore, in a field 506 of the summary screen, the user may select if and which electric devices shall be monitored regarding the estimation of the electric power consumption which may affect the risk of the occurrence of a battery shortage prior to the arrival at the destination. A field 507 additionally provides the optional functionality of setting preferences for the operation of the solution suggestion unit 114. Reference numeral 508 relates to the shown information regarding the currently available energy level of the battery 10.

Summarizing the above, the summary screen 500 shows a confirmation request (buttons 501 and 502) to the user and the currently configured parameters of the monitoring mode, such as the risk monitoring items 503 with the selected risk threshold for the notification, the electricity usage options 506 and the solution preference 507. Regarding the parameters of the monitoring mode, the summary screen 500 allows the user to change the parameters. For example, the user can select one or more of the listed risk monitoring items 503 with the risk threshold. This risk threshold is used to judge if the calculated risk should be notified to the HMI device or not. When the risk monitoring item option of "Arrival Time" is selected in field 503, the destination 504 and the required arrival time 505 need to be set. If the destination corresponds to a reserved charging station (as in FIG. 7), the HMI device can also set the required arrival time to the reserved time of the charging station by referring to the charging station booking information 224 in the memory unit 220. The user can select one or more of the listed electric usage options 506, which are used in the server for calculation of the battery consumption. The user can further select one of the solution preference options 507. The item selected in field 507 is then used for determining the priority of solutions to be recommended.

After confirmation by the user via button 501 (step S107), the configuration parameters are stored in the memory unit 220 and/or sent to the server system 1 for the risk monitoring mode. Referring again to FIG. 6, if the user selects button 502 of the summary screen 500 (step S107 returns no), the process continues with step S101 to show again the main screen. If the user selects button 501 of the summary screen 500 (step S107 returns yes), the HMI control unit 213 sends a monitoring mode activation request to the server system 1 via the communication unit 230 through the network N (which may be received at the server system 1 according to step S1 described above) in the step S108.

After the activation request is sent to the server system 1 (step S108), the HMI device is supposed to receive a response from the server system 1 (step S109), e.g. a response sent in step S4 described above. If the HMI device has not received such a response for a certain period of time (step S109 returns no), the human machine interface unit 240 notifies the user about a communication error (step S113) and goes back to the main screen of the application (step S101).

Otherwise, if step S109 returns yes), the process goes to the next step S110 and checks if the activation is successful or not on the basis of the received response. If the request failed or was denied (step S110 returns no), the human machine interface unit 240 displays the reason of the failure or denial (step S114), and goes back to the main screen of the application (step S101). Otherwise, if step S110 returns yes), the human machine interface unit 240 shows the main screen 550 including an additional icon 509 specifying that the monitoring mode is activated (step S111). After the step S111, the process continues with the risk monitoring process in step S112, the risk monitoring process being described in more detail with reference to FIG. 9 below.

Figure 8:
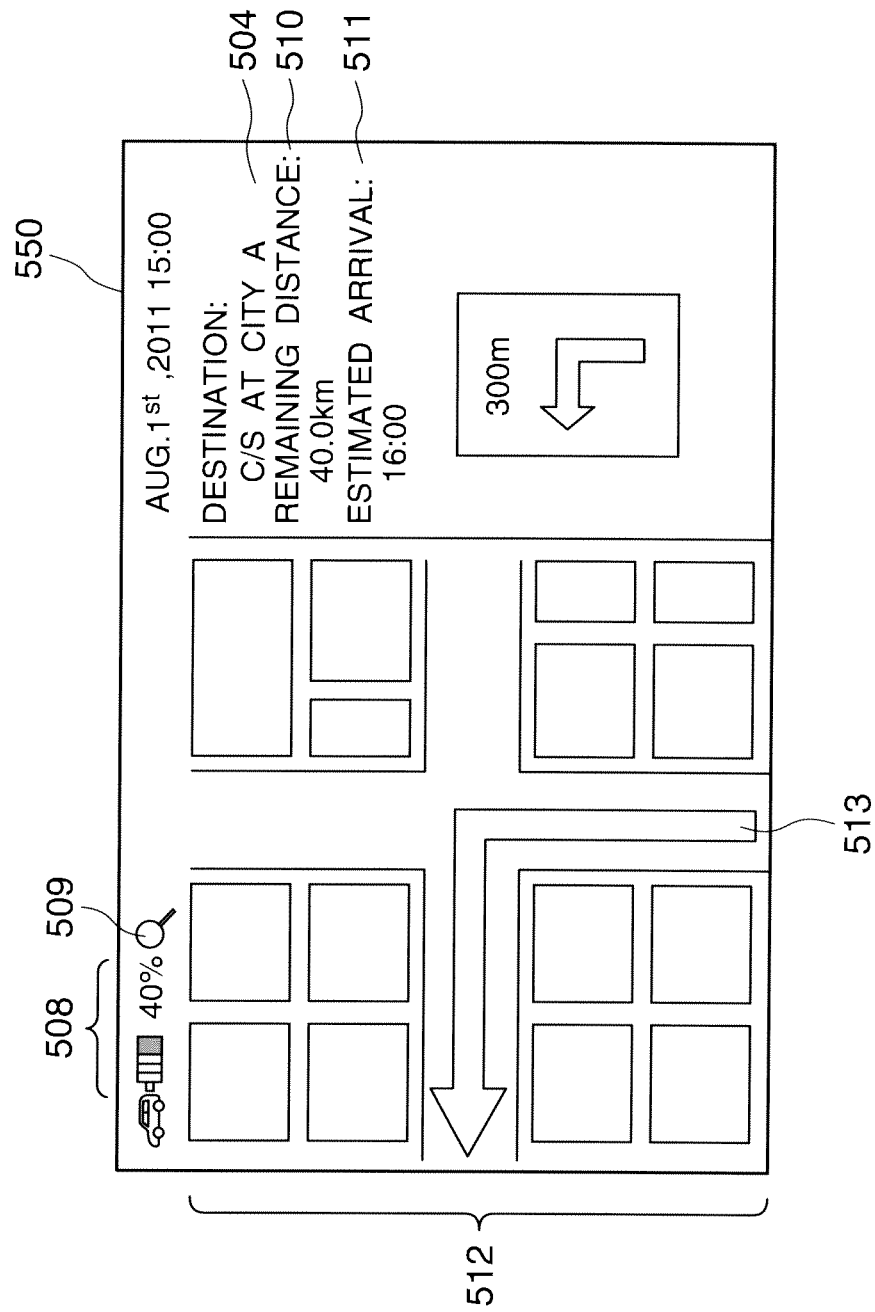
FIG. 8 is an exemplary and schematic view of a screen shown to a user of an electrically driven vehicle according to an embodiment.

FIG. 8 schematically illustrates an example of the main screen 550 with an additional monitoring mode icon 509 illustrating that the monitoring mode is activated. Furthermore, the main screen exemplarily shows information 504 regarding the destination, information 510 regarding the remaining distance to the destination according to a currently set navigation route and information 511 regarding the currently estimated arrival time. A field 512 shows navigational data including a navigational map and route information (such as an arrow 513).

Figure 9:
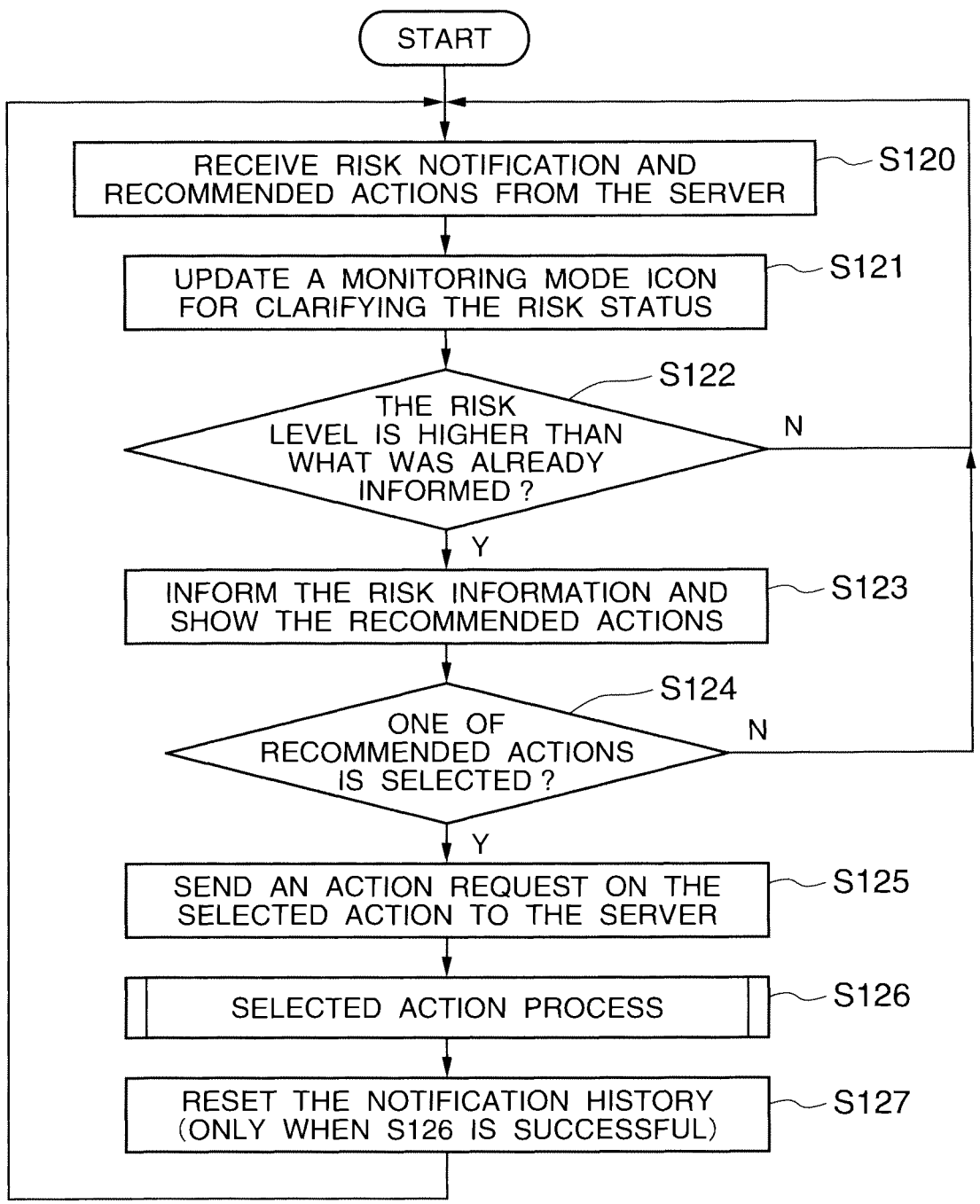
FIG. 9 is an exemplary and schematic view of a flow chart of a method for supporting a user of an electrically driven vehicle at a vehicle side according to an embodiment.

FIG. 9 schematically and exemplarily illustrates a risk monitoring process according to an embodiment of the present disclosure. In the risk monitoring process, the HMI device waits for a risk notification from the server system 1 in step S120 (e.g. a notification sent in step S13 described above). Once a calculated risk is detected to exceed the specified threshold by the server system 1, the HMI device receives the risk notification together with recommended solutions from the server system 1 in step S120. Then, in step S121, the HMI device updates the monitoring mode icon 509 for notifying the current risk status to the user (S122). For example, the icon's color can be changed depending on the risk level, or the risk level can be explicitly written adjacent to the icon 509. This risk status may be kept for a certain period of time. If there is no update for during the period, the risk status may be reset.

In the next step S122, the HMI control unit 214 determines whether the risk level is higher than a previous risk level which was already informed to the user. If step S122 returns no, the HMI control unit 214 refrains from informing the user of the risk information and goes back to the step S120. By this optional step, it can be avoided to unnecessarily bother the user by displaying the similar risk information. However, if the result of step S122 is yes, the human machine interface unit 240 informs the users of the new risk information (see e.g. reference numeral 514 in FIG. 10) as well as the recommended solutions via a display screen and/or other types of HMI output such as voice output (step S123).

Figure 10:
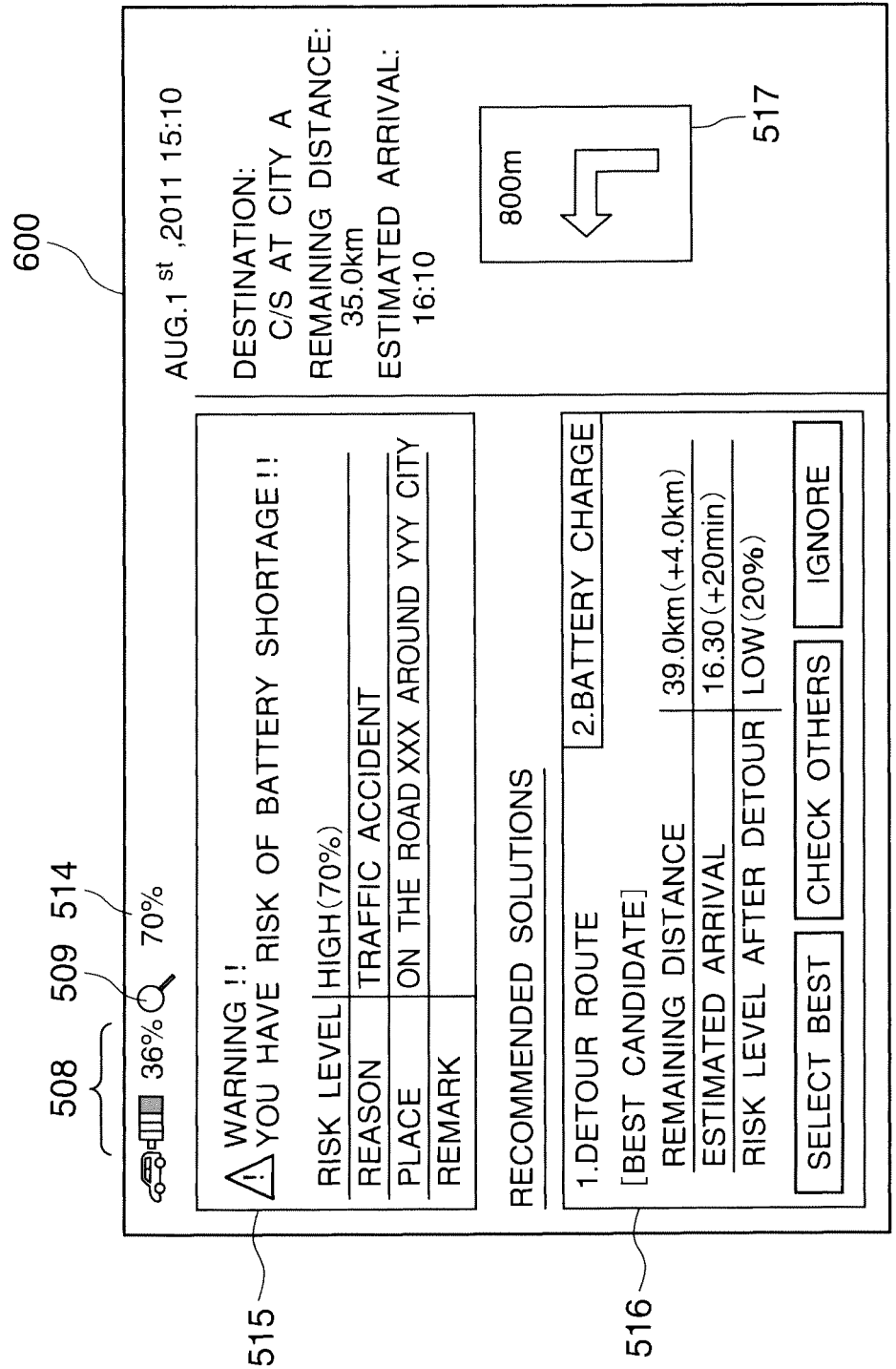
FIG. 10 is an exemplary and schematic view of a screen shown to a user of an electrically driven vehicle according to an embodiment.

FIG. 10 illustrates an example of a risk informing screen 600 of the human machine interface unit 240 displaying the risk information 515 and the recommended solutions 516. First, the monitoring mode icon 509 specifies the risk status by displaying the risk percentage 514. Secondly, the risk information 515 is displayed as a warning to the user. The displayed risk information may include the risk type (here battery shortage, for example), which corresponds to one of the specified monitoring items in the step S106, the risk level, the main reason of the risk or the like. Thirdly, recommended solutions 516 are also displayed in the bottom of the risk informing screen 600.

The recommended solutions 516 may include multiple recommendations. In this case, the risk informing screen 600 shows one of them initially (here: "1. Detour Route", including information on the best candidate of available alternative routes such as distance, estimated arrival time, and the changed risk level associated with the alternative route) and allows the user to display the other solutions. In this example, tab windows are exemplarily used. The displaying order of the multiple recommendations can be determined by the solution preference specified by the user in the step S106.

Figure 11:
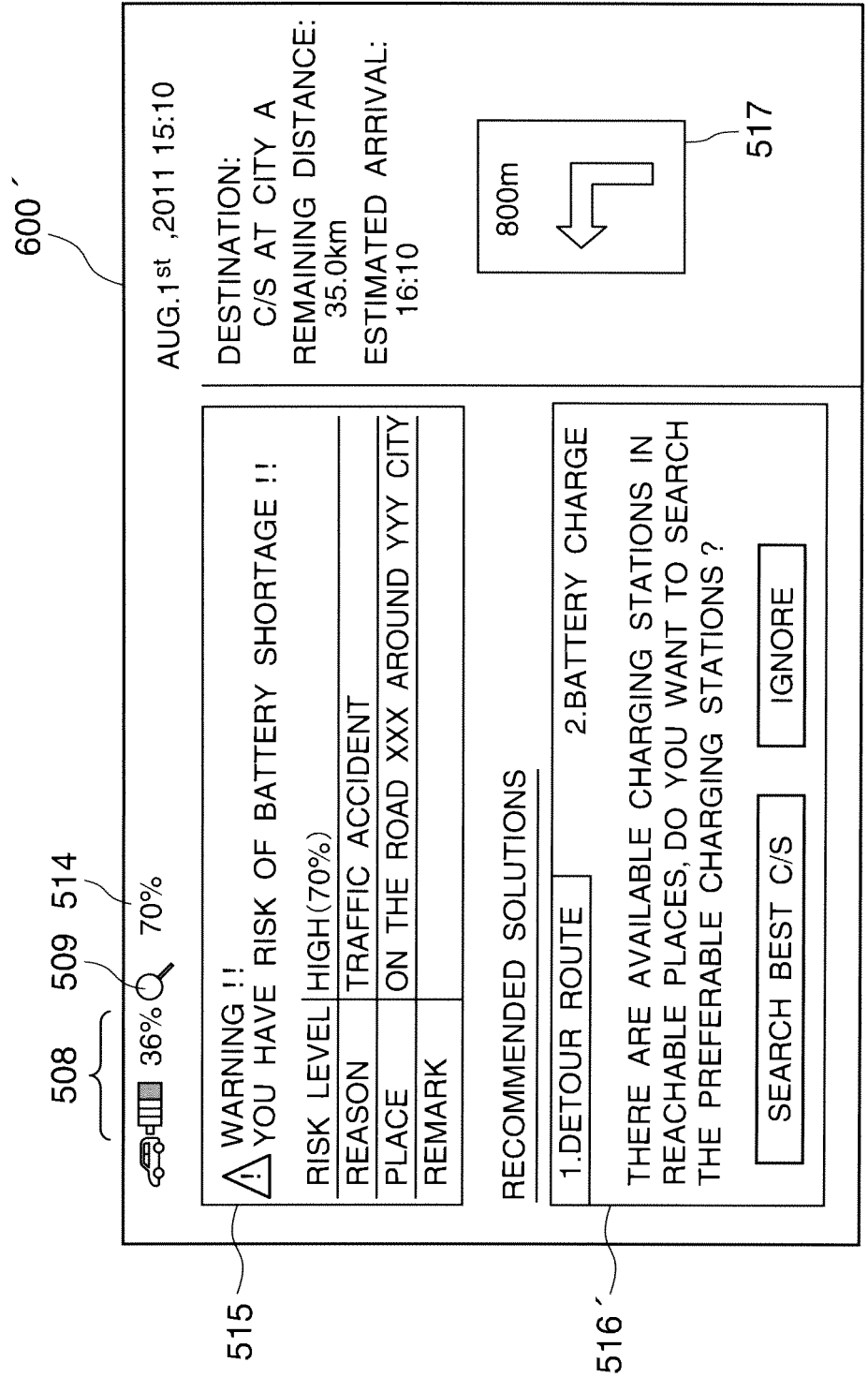
FIG. 11 is an exemplary and schematic view of a screen shown to a user of an electrically driven vehicle according to an embodiment.

FIG. 11 exemplarily illustrates a modified risk informing screen 600' when the user selects the battery charge (second recommendation "2. Battery Charge" in field 516 of the risk informing screen 600 in FIG. 10, resulting in displaying of the modified field 516' (additionally allowing the user to initiate a search for charging station candidates). On the right of the screens 600 and 600', the driver assistance service 517 is kept displaying not to disturb the on-going service. In this example, the risk information 515 and the recommended solutions 516 are displayed automatically, but it is also possible that the HMI device only gives a notification to the user by a short-time display or a voice output and lets the user touch the menu or the monitoring icon in order to see more details.

In the recommended solutions parts 516 and 516', for example, there are provided buttons to request an action or to ignore this warning and the recommendations. If the "ignore" button is selected (step S124 returns No), the warning screen is closed and the main screen is displayed again (step S101). If one of the recommended action buttons is selected (step S124 returns yes), the HMI device sends a corresponding action request to the server system 1 (step S125). After that, the HMI device may perform a selected action process (step S126) and reset a warning notification history if the risk is resolved. If the step S125 is failed for any reason, the HMI device does not reset the warning notification history. Then the process goes back to step S120.

Figure 12:
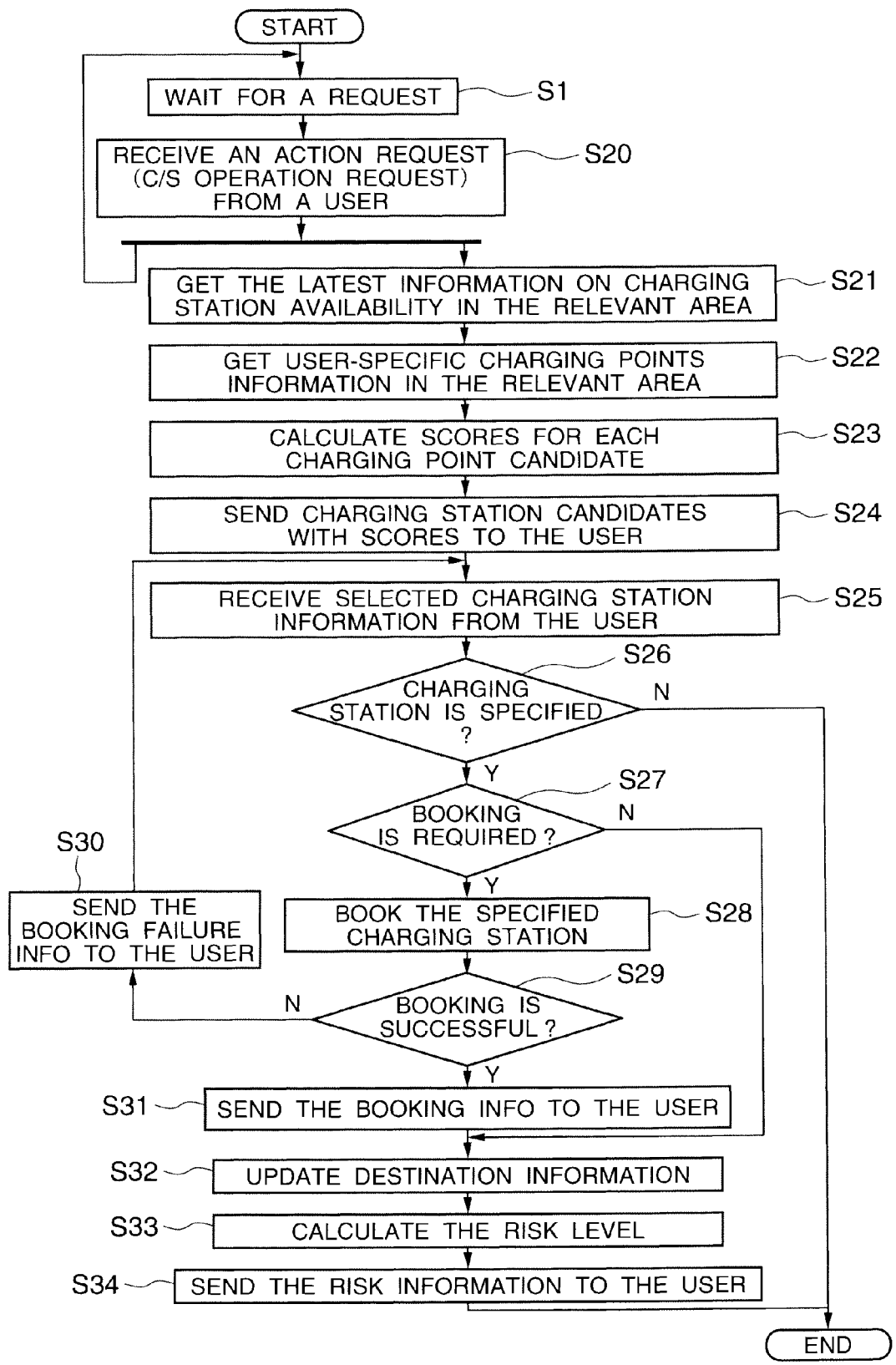
FIG. 12 is an exemplary and schematic view of a flow chart of a method for supporting a user of an electrically driven vehicle at a server side according to an embodiment.
Figure 13:
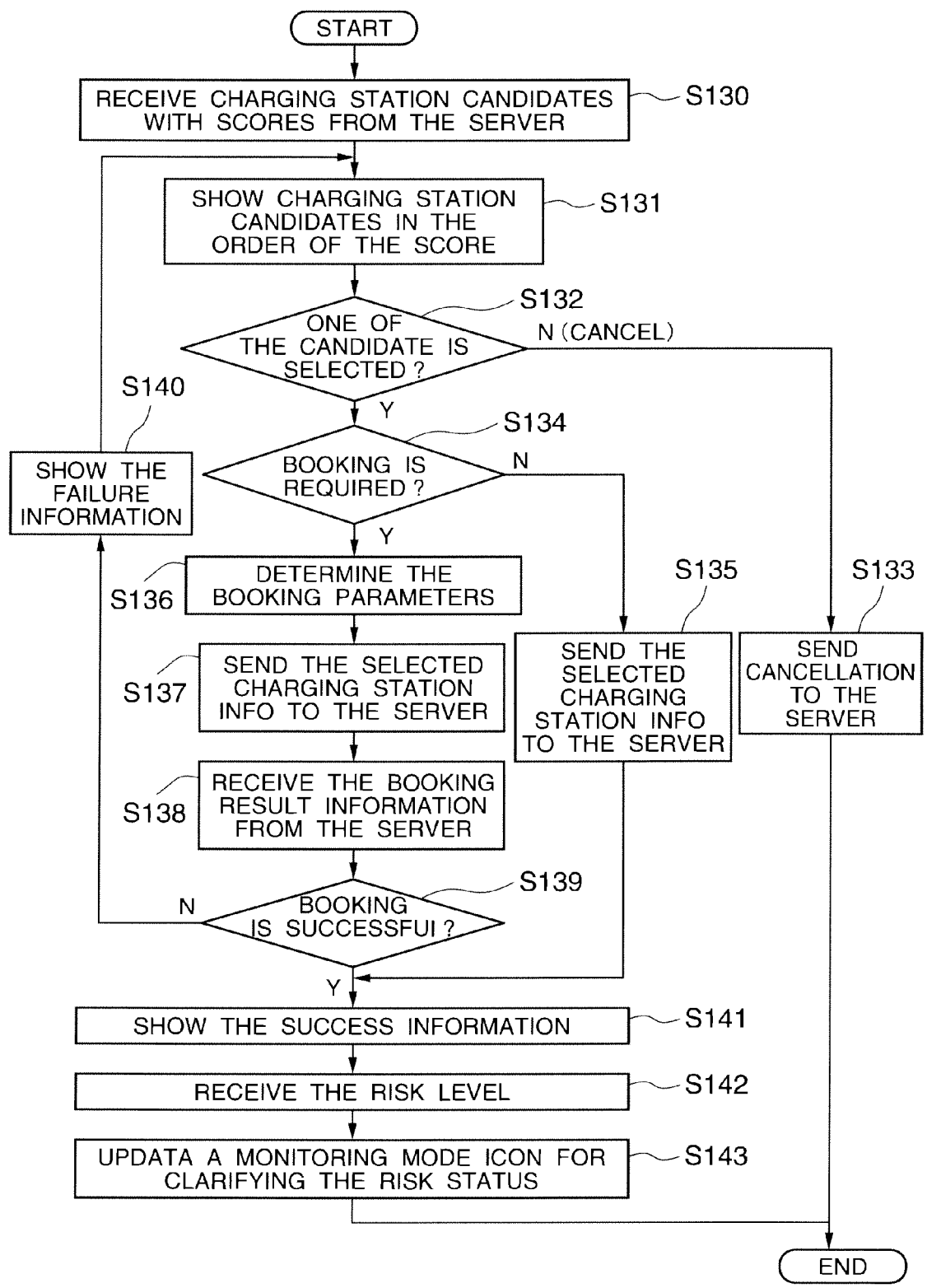
FIG. 13 is an exemplary and schematic view of a flow chart of a method for supporting a user of an electrically driven vehicle at a vehicle side according to an embodiment.

In the action request of the step S125, for example, the charging station search request may be specified. FIG. 12 shows an exemplary server operation method according to an embodiment of the present disclosure, when receiving an action request concerning the charging station search (which may be selected in field 516') and FIG. 13 shows the corresponding HMI device operation method according to an embodiment of the present disclosure.

After the server system 1 receives an action request concerning the requested charging station search (step S20) while waiting for a user request (step S1), the server system initiates the requested process for the charging station search operation. In step S21, the charging station booking control unit 116 first obtains the latest available information on charging station availability in the relevance area on the basis of information 124 stored in the memory unit 120 (which may be automatically and periodically updated) and/or on the basis of information received and/or requested from the charging station center 3.

The relevance area may be, for example, an area defined by a distance that can be still traveled with the vehicle 4 based on the remaining battery level of the battery 10, an area defined by a specified time period, wherein the vehicle 4 can reach points within the area during the specified period of time from any point on the currently set route, the area defined by a specific city, or the like. Also, the relevance area can be specified by the user according to the user preference when sending the action request relating to the charging station search.

In addition to the public charging station information, the server system 1 may also obtains user-specific charging point information (step S22), which can be pre-assigned by the user, e.g. for registering private charging points in advance, such as a private charger at the user's home, for example.

Then, the charging station score calculating unit 114 calculates, for each charging station candidate, a score value on the basis of the user preference (step S23). The respective score may be calculated as one value based on the solution preference specified in the activation request, or may be calculated as multiple values which are relevant to solution preference items, respectively, such as quick arrival, less cost and certainty (see field 507 in FIG. 7).

Then, the server system 1 sends information on one or more of the charging station candidates together with the information on their calculated scores (step S24) via the network N to the HMI device of the user.

Figure 14:
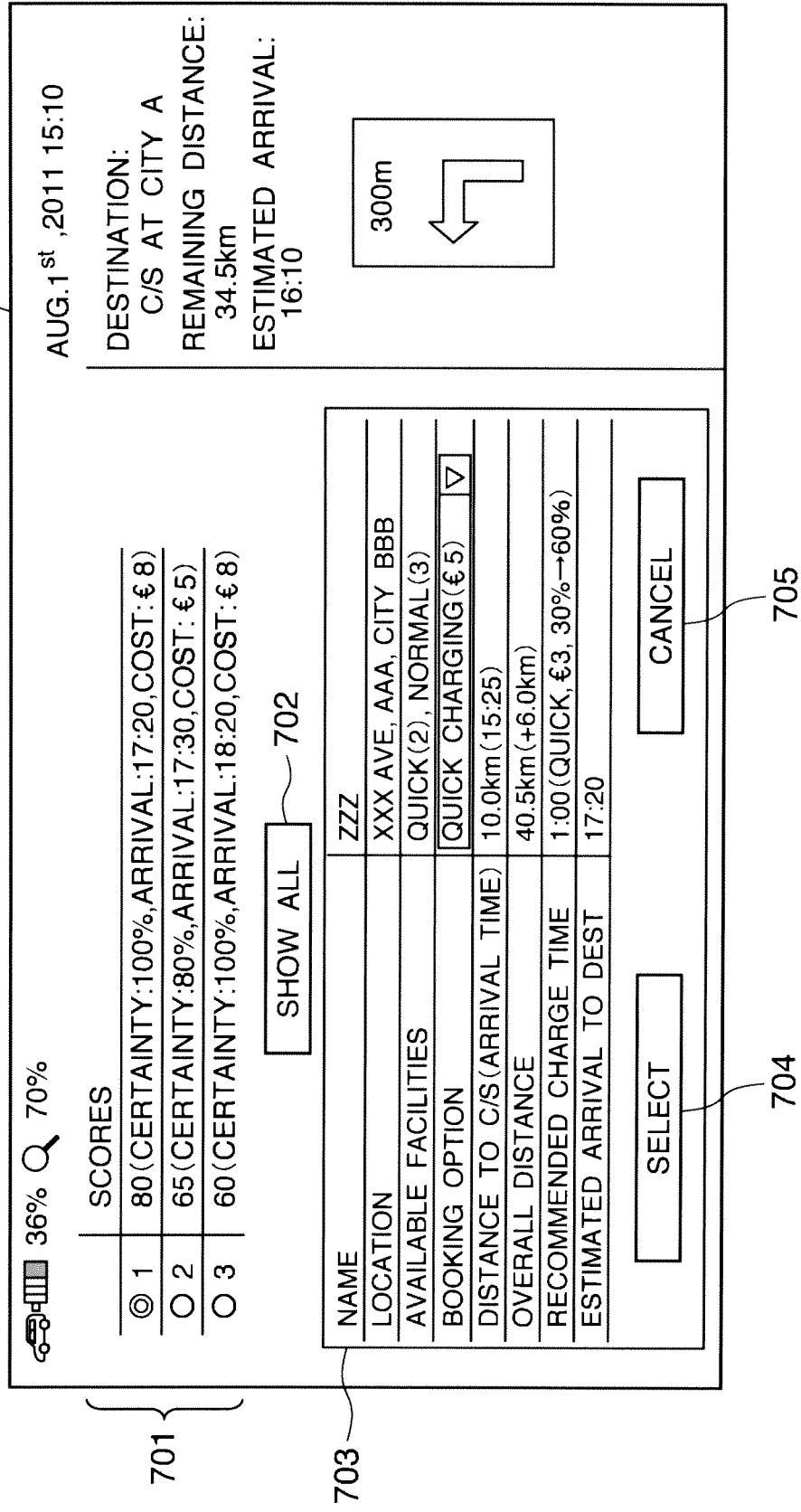
FIG. 14 is an exemplary and schematic view of a screen shown to a user of an electrically driven vehicle according to an embodiment.

When the communication unit 230 of the HMI device 5 (7) receives the information on one or more of the charging station candidates together with the information on their calculated scores from the server system 1 (step S130 in FIG. 13), the human machine interface unit 240 provides the received information to the use (step S131), e.g., in the order of the calculated scores. FIG. 14 exemplarily and schematically shows a charging station candidate screen 700 displaying the charging station candidates at the human machine interface unit 240.

The charging station candidate screen 700 shows a list 701 of the charging station candidates on which information was received from the server system 1. The list 701 is exemplarily sorted by the calculated score but the candidates may also be listed according to other criteria, such as certainty, quick arrival and low cost.

The charging station candidate screen 700 exemplarily shows the list only partially due to a limitation of the display size, but provides the user with the functionality of selecting an alternative view showing all possible candidates by selecting the "Show All" button 702. The candidate list 702 further provides the user with the functionality of selecting one of the listed charging station candidates.

The detailed information about the selected charging station candidate is shown in the field 703. In this example of screen 700 the field 703 indicates the name of the selected charging station candidate, the location of the selected charging station candidate, the available facilities at the selected charging station candidate (number of charging units and types of charging units), the selectable booking options for the selected charging station candidate, the distance to the selected charging station candidate and the estimated arrival time at the selected charging station candidate, the overall distance to the final destination from the current position via the selected charging station candidate, the recommended charging time at the selected charging station candidate and the estimated arrival time to the final destination from the current position via the selected charging station candidate taking into account the charging time.

The available facilities at the selected charging station candidate may specify, for example, how many charging slots are available for each type of charger, such as quick charger (high voltage) and normal charger (domestic voltage). The selectable booking options specify booking options that are selectable by the user for the selected charging station candidate. For example, if quick chargers and normal chargers are available at the selected charging station candidate, there may be provided the selectable options of charging with a quick charger, charging with a normal charger and no booking.

The recommended charging time may be calculated based on the charger type and the required battery level which is minimally necessary to be able to reach the destination without further charging. Accordingly, if a specific charging level of the battery 10 (e.g. 60%) is estimated to be sufficient for being able to reach the destination, the recommended charging time is set as the time that is required to charge the battery 10 up to the specific charging level based on the selected charger type. For precautionary reasons, it is further possible to recommend a charging time which is required to charge the battery 10 up to a level corresponding to the specific charging level plus a tolerance (e.g. plus 5%). Furthermore, field 703 exemplarity shows also the costs for the charging operation at the at the selected charging station candidate taking into account the recommended charging time (e.g. €3) and how the battery 10 is going to recover (e.g. 30%->60%) by the recommended charging operation.

Furthermore, the charging station candidate screen 700 includes a select button 704 and a cancel button 705 allowing the user to select the selected charging station candidate for booking, i.e. in order to proceed with making a reservation for the selected charging station candidate (step 132 returns yes), or to cancel the booking operation (step 132 returns yes). In the latter case, a cancellation request is sent to the server system 1 (step S133) and the process ends.

However, if the step S132 of determining whether a charging station candidate was selected returns yes, it is determined for the selected charging station candidate whether booking is required or not. If not, the HMI control unit 214 by means of the communication unit 230 sends a message to the server system 1 informing the server system 1 about the user's selection (step S135) and continues with step S141 described later.

Figure 15:
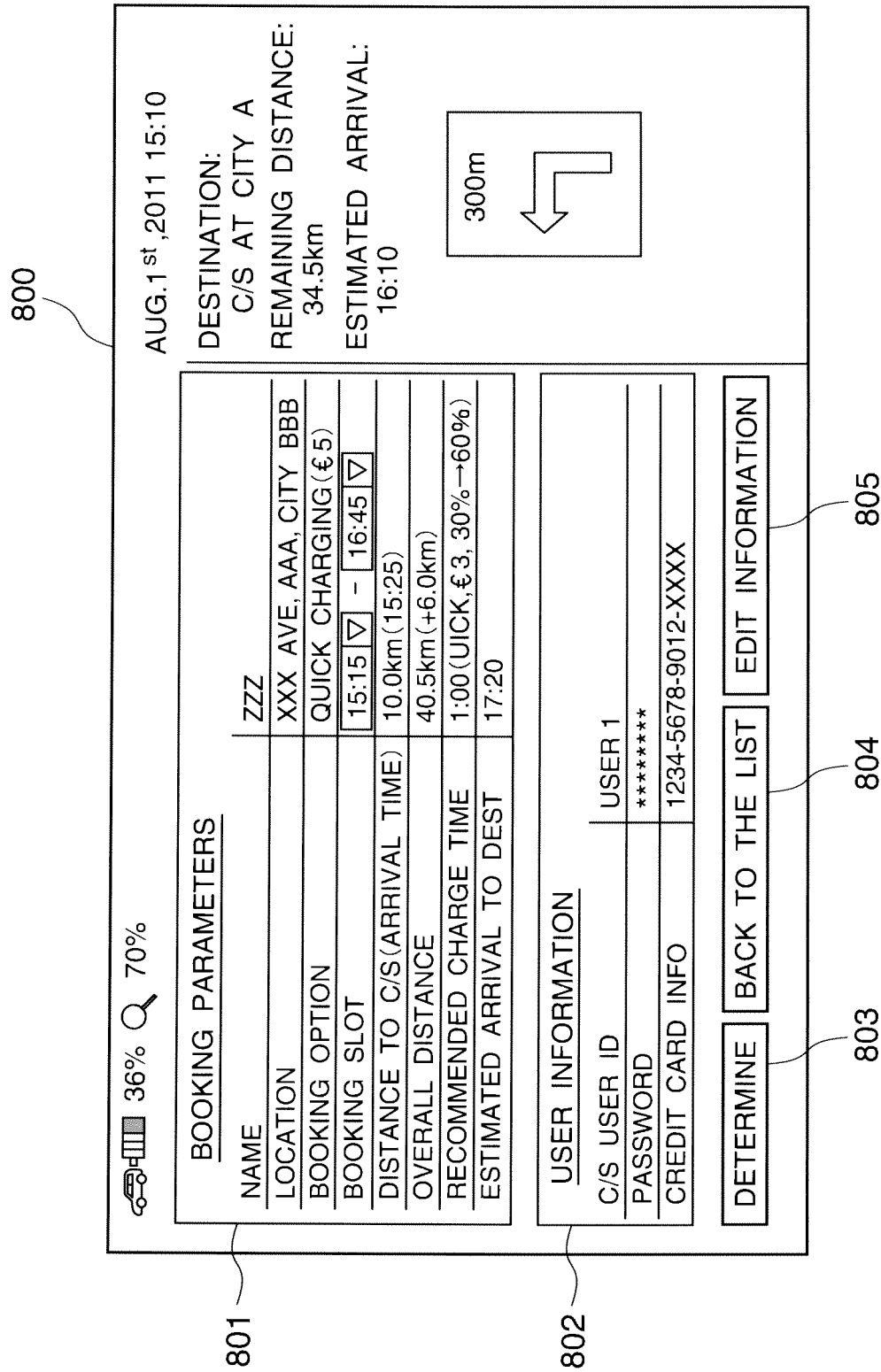
FIG. 15 is an exemplary and schematic view of a screen shown to a user of an electrically driven vehicle according to an embodiment.

If step S132 returns yes, the process continues with step S136 of determining booking parameters for the booking operation. FIG. 15 exemplarily and schematically illustrates an example of a booking parameter screen 800 enabling a determination of booking parameters on the basis of a user input. Alternatively or in addition, booking parameters may be obtained from the booking information 224 stored in the memory unit 220.

The booking parameter screen 800 includes a field 801 relating to the booking parameter determination showing information of the charging station selected for booking (similar to the information displayed in field 703) and, additionally, displaying the time slot for which a reservation is to be made at the selected charging station, wherein the charging start time and the charging end time are configurable by user input. In the display of the time slot for booking, recommended parameters, such as the recommended charging start time and the recommended charging end time, are set by default.

The booking parameter screen 800 of FIG. 15 also displays a field 802 showing the user information to be used for the booking, such as the user ID, the authentication data for the charging station booking and payment data like credit card information. The field 802 can be modified by the user in an edit mode initiated by operation of the button 805: "Edit information". By operating the "Determine" button 803, the user can confirm the currently displayed information in order to initiate the booking operation on the basis of the determined booking parameters. By operating the "Back to the list" button 804, the user can go back to the charging station candidate screen 700 when he desires to select another charging station candidate for booking.

Once the booking parameters for the booking operation are determined, the HMI control unit 214 by means of the communication unit 230 sends the information on the charging station information together with the determined booking parameters to the server system 1 (step S137). When the server system 1 receives the selected charging station information (step S25 in FIG. 12), the charging station booking control unit 116 determines whether a charging station candidate for booking is specified by the received data or not (step S26). If it is not specified (step S26 returns no; e.g. in case of receipt of a cancellation request), the process ends.

If step S26 returns yes, the charging station booking control unit 116 determines whether the booking option is specified or not (step S27). If not specified, the process goes to the step S32. Otherwise, the charging station booking control unit 116 makes a reservation at the specified charging station (step S28) through the network N via a booking interface of the charging station center 3 on the basis of the determined booking parameters by using the user information such as the user ID and authentication data of the booking system and payment information (such as, e.g., credit card information). The user information may be received from the HMI device when sending the booking information or it may be pre-registered in the user information 121 stored in the memory unit 120 of the server system 1.

If the booking operation fails for any reason (step S29 of determining whether the booking was successful returns no), a booking failure message is sent to the HMI device in order to notify the user (step S30) and goes back to the step S25. On the other hand, if the booking was successful (step S29 returns yes), the charging station booking control unit 116 by means of the communication unit 130 sends a booking confirmation message to the user (step S31) and updates the destination information of the user by setting the location of the newly booked charging station as the intermediate destination (step S32) for route calculation and navigation, and also for the destination used for risk monitoring items such as traffic jam, delayed arrival or battery shortage. Accordingly, if the risk monitoring mode is activated, the risk calculation unit 112 calculates the risk levels for selected risk monitoring items, e.g. up to the charging station as a destination and/or up to the final destination by taking into account the battery charging in the newly booked charging station (step S33), and the calculation results are sent via the communication unit 130 to the HMI device for notifying the user about the new calculated risk levels (step S34). Then, the booking process ends at the system server 1.

Although the above booking process is discussed for an active monitoring mode, it is to be noted the action request concerning the requested charging station search of step S20 may also be received at the server system 1 during a time period in which the monitoring mode is deactivated. For example, in case the user would like to book a charging station proactively, the search for and selection of charging station candidates and the booking of a selected charging station candidate can be handled similarly.

Continuing with step S138 of after step S34 above at the server side, the communication unit 230 of the HMI device receives a booking result message from the server system 1 (step S138). If the received booking result message indicates a booking failure (S139 returns no), the human machine interface unit 240 notifies the user about the booking failure information via a screen and/or a voice output (step S140). On the other hand, if the received booking result message indicates a booking success (S139 returns yes), the human machine interface unit 240 notifies the user about the booking success information via a screen and/or a voice output (step S141). Next, the communication unit 230 receives the updated risk information from the server system 1 (step S142) which was sent in step S34, and then updates the monitoring mode icon on the screen of the human machine interface unit 240 notifying the user about the current risk status (step S143). Accordingly, the charging station operation request of the user is accomplished as a selected action process (e.g. step S126), and the HMI device process goes to S127 of FIG. 9.

In the above-described embodiment, the risk monitoring process is mainly performed at the server side while information is received from the vehicle-side, but the present disclosure is not limited to server-sided risk monitoring but it is also possible to provide embodiments according to which the HMI device such as an on-board unit or a mobile HMI unit which is communicably connectable with the vehicle monitors the risk by repeatedly or even periodically, potentially obtaining information such as weather information, traffic information, and/or charging station information through the network N.

I claim:

1. A system for supporting a user of an electrically driven vehicle, comprising:
   a position information obtaining unit configured to obtain, during traveling, position information indicating a position of the vehicle;
   an electric power amount estimating unit configured to estimate, during traveling, a remaining electric power amount of an electric power source of the vehicle;
   a shortage risk estimating unit configured to estimate, during traveling, an estimated risk of electric power amount shortage on a basis of the estimated remaining electric power amount;
   a notifying unit configured to notify a user in case the estimated risk of electric power amount shortage estimated by the shortage risk estimating unit exceeds a predetermined threshold;
   a traffic information acquiring unit configured to acquire traffic information;
   wherein
      the required electric power amount estimating unit is configured to estimate a required electric power amount on a basis of traffic information acquired by the traffic information acquiring unit, and/or
      the shortage risk estimating unit is configured to estimate the estimated risk of electric power amount shortage on the basis of traffic information acquired by the traffic information acquiring unit; and
   a route calculation unit configured to calculate travel routes from a determined position to a destination position, wherein when the shortage risk estimating unit estimates that the estimated risk of electric power amount shortage exceeds a predetermined threshold due to traffic conditions on a current route which are indicated in the traffic information, the route calculation unit is configured to calculate one or more alternative routes from the determined position to the destination position, and the required electric power amount estimating unit is configured to estimate, for each of the one or more alternative routes, an alternatively required electric power amount required for traveling with the vehicle from the determined position to the destination position along the respective alternative route, and the shortage risk estimating unit is configured to estimate, for each of the one or more alternative routes, a respective estimated risk of electric power amount shortage on the basis of the remaining electric power amount and the alternatively required electric power amount.

2. The system according to claim 1, wherein
the notifying unit is further configured to notify the user of the vehicle about alternative routes for which the respective estimated risk of electric power amount shortage estimated by the shortage risk estimating unit is below the predetermined threshold.

3. A system for supporting a user of an electrically driven vehicle, comprising:
a position information obtaining unit configured to obtain, during traveling, position information indicating a position of the vehicle;
an electric power amount estimating unit configured to estimate, during traveling, a remaining electric power amount of an electric power source of the vehicle;
a shortage risk estimating unit configured to estimate, during traveling, an estimated risk of electric power amount shortage on a basis of the estimated remaining electric power amount;
a notifying unit configured to notify a user in case the estimated risk of electric power amount shortage estimated by the shortage risk estimating unit exceeds a predetermined threshold;
a traffic information acquiring unit configured to acquire traffic information;
wherein
the required electric power amount estimating unit is configured to estimate a required electric power amount on a basis of traffic information acquired by the traffic information acquiring unit, and/or
the shortage risk estimating unit is configured to estimate the estimated risk of electric power amount shortage on the basis of traffic information acquired by the traffic information acquiring unit; and
a delay risk estimating unit configured to estimate, during traveling, an estimated risk of a delayed arrival time at a destination position on a basis of an intended arrival time being specified for the destination position and traffic information acquired by the traffic information acquiring unit, in particular wherein the destination position is a position of a specific support station and/or the intended arrival time is an intended arrival time at the specific support station.

4. The system according to claim 3, wherein
the notifying unit is further configured to notify the user of the vehicle in case the estimated risk of a delayed arrival time estimated by the delay risk estimating unit exceeds a predetermined threshold value.

5. A system for supporting a user of an electrically driven vehicle, comprising:
a position information obtaining unit configured to obtain, during traveling, position information indicating a position of the vehicle;
an electric power amount estimating unit configured to estimate, during traveling, a remaining electric power amount of an electric power source of the vehicle;
a shortage risk estimating unit configured to estimate, during traveling, an estimated risk of electric power amount shortage on a basis of the estimated remaining electric power amount;
a notifying unit configured to notify a user in case the estimated risk of electric power amount shortage estimated by the shortage risk estimating unit exceeds a predetermined threshold;
a support station information acquiring unit configured to acquire support station information comprising at least one of position information indicating positions of one or more support stations and availability information indicating an availability status of the one or more support stations;
wherein
a required electric power amount estimating unit is configured to estimate, for each of one or more support stations indicated in the support station information, a required electric power amount required for traveling with the vehicle from a determined position to a position of the respective support station, and
the shortage risk estimating unit is configured to estimate, for each of the one or more support stations indicated in the support station information, an estimated risk of electric power amount shortage, when traveling from the determined position to the position of the respective support station.

6. The system according to claim 5, wherein
the notifying unit is configured to notify the user of the vehicle about support stations for which the estimated risk of electric power amount shortage estimated by the shortage risk estimating unit is below a predetermined threshold value.

7. A system for supporting a user of an electrically driven vehicle, comprising:
a position information obtaining unit configured to obtain, during traveling, position information indicating a position of the vehicle;
an electric power amount estimating unit configured to estimate, during traveling, a remaining electric power amount of an electric power source of the vehicle;
a shortage risk estimating unit configured to estimate, during traveling, an estimated risk of electric power amount shortage on a basis of the estimated remaining electric power amount;
a notifying unit configured to notify a user in case the estimated risk of electric power amount shortage estimated by the shortage risk estimating unit exceeds a predetermined threshold;
a support station information acquiring unit configured to acquire support station information comprising at least one of position information indicating positions of one or more support stations and availability information indicating an availability status of the one or more support stations; and
a support station booking support unit configured to support booking of support stations that are available for booking operations using a communication network (N), wherein the support station booking support unit is configured to:
  issue a request for reservation directed to one of the support stations indicated in the support station information, in particular when the shortage risk estimating unit estimates that the estimated risk of electric power amount shortage exceeds a predetermined threshold, and/or
  issue a request for cancellation of a reservation directed to a support station indicated in the support station information, in particular when the estimated risk of electric power amount shortage for traveling with the vehicle from the determined position to the position of the respective support station exceeds a predetermined threshold.

8. A system for supporting a user of an electrically driven vehicle, comprising:
  a position information obtaining unit configured to obtain, during traveling, position information indicating a position of the vehicle;
  an electric power amount estimating unit configured to estimate, during traveling, a remaining electric power amount of an electric power source of the vehicle;
  a shortage risk estimating unit configured to estimate, during traveling, an estimated risk of electric power amount shortage on the basis of the estimated remaining electric power amount;
  a notifying unit configured to notify a user in case the estimated risk of electric power amount shortage estimated by the shortage risk estimating unit exceeds a predetermined threshold;
  wherein
    the system comprises an on-board apparatus being mountable to the vehicle, the on-board apparatus comprising at least one of a position monitoring unit, a required electric power amount estimating unit, the electric power amount estimating unit, and the shortage risk estimating unit;
    the system comprises an external apparatus being communicably connectable with communication unit of the vehicle, the external apparatus comprising at least one of the position monitoring unit, the required electric power amount estimating unit, the electric power amount estimating unit, and the shortage risk estimating unit; or
  the system comprises an on-board apparatus being mountable to the vehicle and an external apparatus having communication unit being communicably connectable with communication unit of the vehicle, the on-board apparatus being configured to communicate with the external apparatus and comprising at least one of the position monitoring unit, the required electric power amount estimating unit, the electric power amount estimating unit, and the shortage risk estimating unit, and
  the external apparatus being configured to communicate with the on-board apparatus and comprising the other unit of the position monitoring unit, the required electric power amount estimating unit, the electric power amount estimating unit, and the shortage risk estimating unit.

9. The system according to claim 7, further comprising:
a delay risk estimating unit configured to estimate, during traveling, an estimated risk of a delayed arrival time at the destination position on a basis of an intended arrival time being specified for the destination position and traffic information acquired by the traffic information acquiring unit, in particular wherein the destination position is a position of a specific support station and/or the intended arrival time is an intended arrival time at the specific support station,
wherein the notifying unit is further configured to notify the user of the vehicle in case the estimated risk of a delayed time estimated by the delay risk estimating unit exceeds a predetermined threshold value, to issue a request for cancellation of reservation having been made to one of the support stations and to issue a request for a rebooking of reservation to be made to another support station than the one of the support stations.

10. The system according to claim 9, wherein the another support station is closer to the vehicle than the one of the support stations.

* * * * *

UNITED STATES PATENT AND TRADEMARK OFFICE
CERTIFICATE OF CORRECTION

| | | |
|---|---|---|
| PATENT NO. | : 8,825,354 B2 | Page 1 of 1 |
| APPLICATION NO. | : 13/599442 | |
| DATED | : September 2, 2014 | |
| INVENTOR(S) | : Yuki Horita | |

It is certified that error appears in the above-identified patent and that said Letters Patent is hereby corrected as shown below:

On the Title Page, please correct the following:

Item (30)    Foreign Application Priority Data

Please replace "11184289" with --11184289.4--

Signed and Sealed this
Seventeenth Day of March, 2015

Michelle K. Lee
*Director of the United States Patent and Trademark Office*